US012614405B2

(12) United States Patent
Mehra et al.

(10) Patent No.: US 12,614,405 B2
(45) Date of Patent: Apr. 28, 2026

(54) FACILITATING IDENTIFICATION OF FILLABLE REGIONS IN A FORM

(71) Applicant: ADOBE INC., San Jose, CA (US)

(72) Inventors: Ashutosh Mehra, Noida (IN); Christopher Alan Tensmeyer, Fulton, MD (US); Vlad Ion Morariu, Potomac, MD (US); Jiuxiang Gu, Baltimore, MD (US)

(73) Assignee: Adobe Inc., San Jose, CA (US)

( * ) Notice: Subject to any disclaimer, the term of this patent is extended or adjusted under 35 U.S.C. 154(b) by 589 days.

(21) Appl. No.: 17/577,605

(22) Filed: Jan. 18, 2022

(65) Prior Publication Data

US 2023/0230406 A1     Jul. 20, 2023

(51) Int. Cl.
*G06V 30/412*     (2022.01)
*G06F 40/174*     (2020.01)
*G06N 20/20*     (2019.01)

(52) U.S. Cl.
CPC .......... *G06V 30/412* (2022.01); *G06F 40/174* (2020.01); *G06N 20/20* (2019.01)

(58) Field of Classification Search
None
See application file for complete search history.

(56) References Cited

U.S. PATENT DOCUMENTS 10,402,640  B1     9/2019   Becker et al.
2019/0286691  A1*     9/2019   Sodhani ................ G06F 40/216

2022/0292258  A1*     9/2022   Zeng .................... G06V 30/413
2023/0084845  A1*     3/2023   Lu ......................... G06V 30/416
382/176
2023/0196748  A1*     6/2023   Hariharan ............ G06V 10/764
382/103
2023/0351115  A1*     11/2023   Zeng .................... G06V 30/413

FOREIGN PATENT DOCUMENTS

EP          3882814 A1      9/2021

OTHER PUBLICATIONS

Soto, Carlos X. Visual detection with context fo rdocument layout analysis. No. BNL-212125-2019-COPA. Brookhaven National Lab. (BNL), Upton, NY (United States), 2019. (Year: 2019).*
Ren, Shaoqing, et al. "Faster r-cnn: Towards real-time object detection with region proposal networks." Advances in neural information processing systems 28 (2015). (Year: 2015).*

(Continued)

*Primary Examiner* — Sean M Conner
(74) *Attorney, Agent, or Firm* — Shook, Hardy & Bacon L.L.P.

(57)          ABSTRACT

Methods and systems are provided for facilitating identification of fillable regions and/or data associated therewith. In embodiments, a candidate fillable region indicating a region in a form that is a candidate for being fillable is obtained. Textual context indicating text from the form and spatial context indicating positions of the text within the form are also obtained. Fillable region data associated with the candidate fillable region is generated, via a machine learning model, using the candidate fillable region, the textual context, and the spatial context. Thereafter, a fillable form is generated using the fillable region data, the fillable form having one or more fillable regions for accepting input.

19 Claims, 11 Drawing Sheets

900

(56)          References Cited

OTHER PUBLICATIONS

Xu, Yiheng, et al. "Layoutlm: Pre-training of text and layout for document image understanding." Proceedings of the 26th ACM SIGKDD International Conference on Knowledge Discovery & Data Mining. 2020.

Xu, Yang, et al. "LayoutLMv2: Multi-modal pre-training for visually-rich document understanding." arXiv preprint arXiv:2012.14740 (2020).

Li, C., Bi, B., Yan, M., Wang, W., Huang, S., Huang, F., & Si, L. (2021). StructuralLM: Structural Pre-training for Form Understanding. arXiv preprint arXiv:2105.11210.

Jaume, G., Ekenel, H. K., & Thiran, J. P. (Sep. 2019). Funsd: A dataset for form understanding in noisy scanned documents. In 2019 International Conference on Document Analysis and Recognition Workshops (ICDARW) (vol. 2, pp. 1-6). IEEE.

Aggarwal, M., Sarkar, M., Gupta, H., & Krishnamurthy, B. (2020). Multi-modal association based grouping for form structure extraction. In Proceedings of the IEEE/CVF Winter Conference on Applications of Computer Vision (pp. 2075-2084).

Bodla, N., Singh, B., Chellappa, R., & Davis, L. S. (2017). Soft-NMS—improving object detection with one line of code. In Proceedings of the IEEE international conference on computer vision (pp. 5561-5569).

Office Action received for German Patent Application No. 102022129588.5, mailed on Oct. 1, 2025, 12 pages of Original OA only.

* cited by examiner

FORM ASSISTANCE TOOL 204

FORM PREPROCESSOR 220

IMAGE FEATURE MANAGER 222

OBJECT DETECTOR 224

FILLABLE REGION DATA IDENTIFIER 226

FILLABLE FORM PROVIDER 228

DATA STORE 230

TRAINING DATA 232

MACHINE LEARNING MODELS 234

MODEL OUTPUT 236

410

402

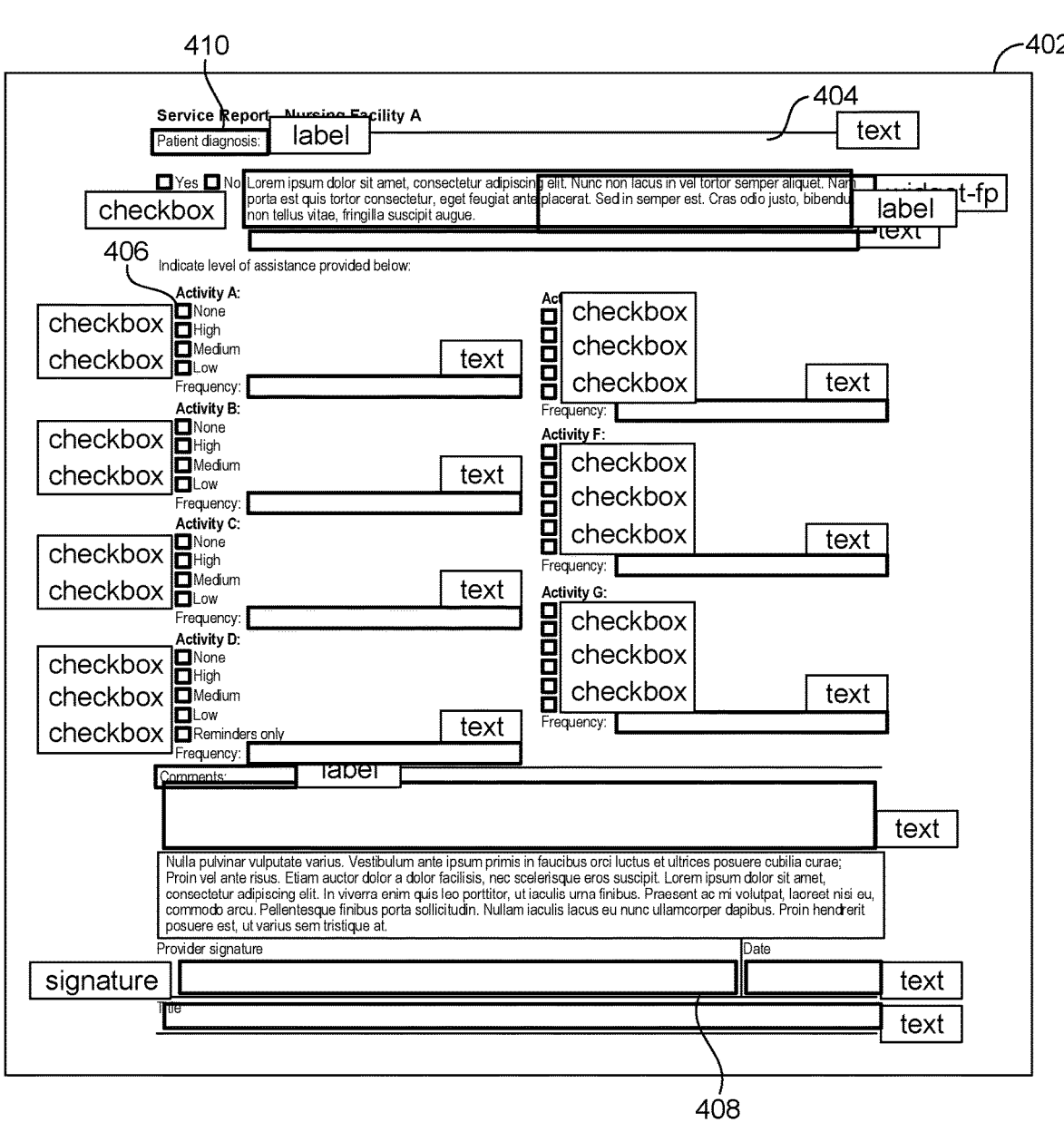

404

Service Report—Nursing Facility A

Patient diagnosis:    label    text

☐ Yes ☐ No    Lorem ipsum dolor sit amet, consectetur adipiscing elit. Nunc non lacus in vel tortor semper aliquet. Nam porta est quis tortor consectetur, eget feugiat ante placerat. Sed in semper est. Cras odio justo, bibendu non tellus vitae, fringilla suscipit augue.    label    text-fp    text checkbox

406

Indicate level of assistance provided below:

Activity A:    ☐ None    ☐ High    ☐ Medium    ☐ Low
checkbox
checkbox    text
Frequency:

Activity B:    ☐ None    ☐ High    ☐ Medium    ☐ Low
checkbox
checkbox    text
Frequency:

Activity C:    ☐ None    ☐ High    ☐ Medium    ☐ Low
checkbox
checkbox    text
Frequency:

Activity D:    ☐ None    ☐ High    ☐ Medium    ☐ Low    ☐ Reminders only
checkbox
checkbox
checkbox    text
Frequency:

Ac    checkbox
checkbox
checkbox    text
Frequency:

Activity F:    checkbox
checkbox
checkbox    text
Frequency:

Activity G:    checkbox
checkbox
checkbox    text
Frequency:

Comments:    label text

Nulla pulvinar vulputate varius. Vestibulum ante ipsum primis in faucibus orci luctus et ultrices posuere cubilia curae; Proin vel ante risus. Etiam auctor dolor a dolor facilisis, nec scelerisque eros suscipit. Lorem ipsum dolor sit amet, consectetur adipiscing elit. In viverra enim quis leo porttitor, ut iaculis urna finibus. Praesent ac mi volutpat, laoreet nisi eu, commodo arcu. Pellentesque finibus porta sollicitudin. Nullam iaculis lacus eu nunc ullamcorper dapibus. Proin hendrerit posuere est, ut varius sem tristique at.

Provider signature    Date signature    text

Title    text

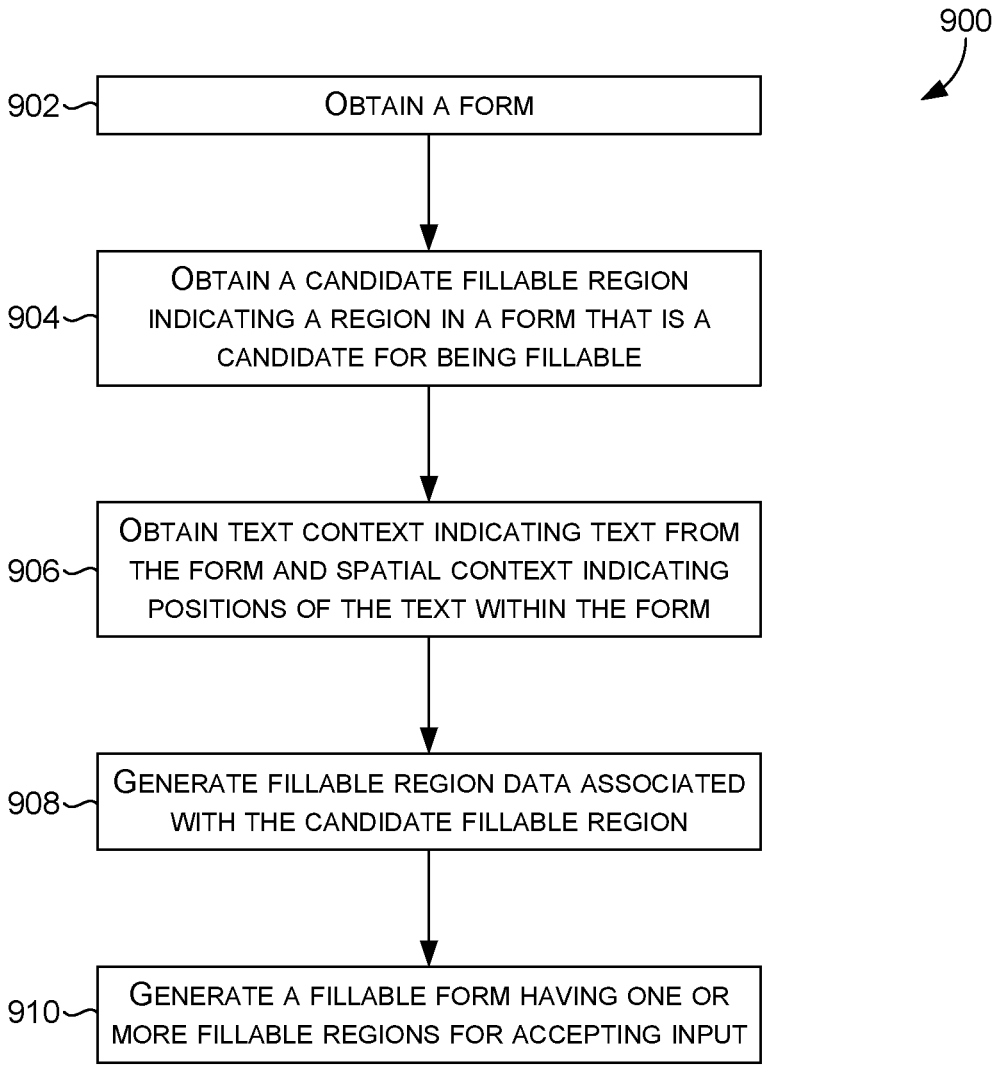

902 — OBTAIN A FORM

904 — OBTAIN A CANDIDATE FILLABLE REGION INDICATING A REGION IN A FORM THAT IS A CANDIDATE FOR BEING FILLABLE

906 — OBTAIN TEXT CONTEXT INDICATING TEXT FROM THE FORM AND SPATIAL CONTEXT INDICATING POSITIONS OF THE TEXT WITHIN THE FORM

908 — GENERATE FILLABLE REGION DATA ASSOCIATED WITH THE CANDIDATE FILLABLE REGION

910 — GENERATE A FILLABLE FORM HAVING ONE OR MORE FILLABLE REGIONS FOR ACCEPTING INPUT

FIG. 9

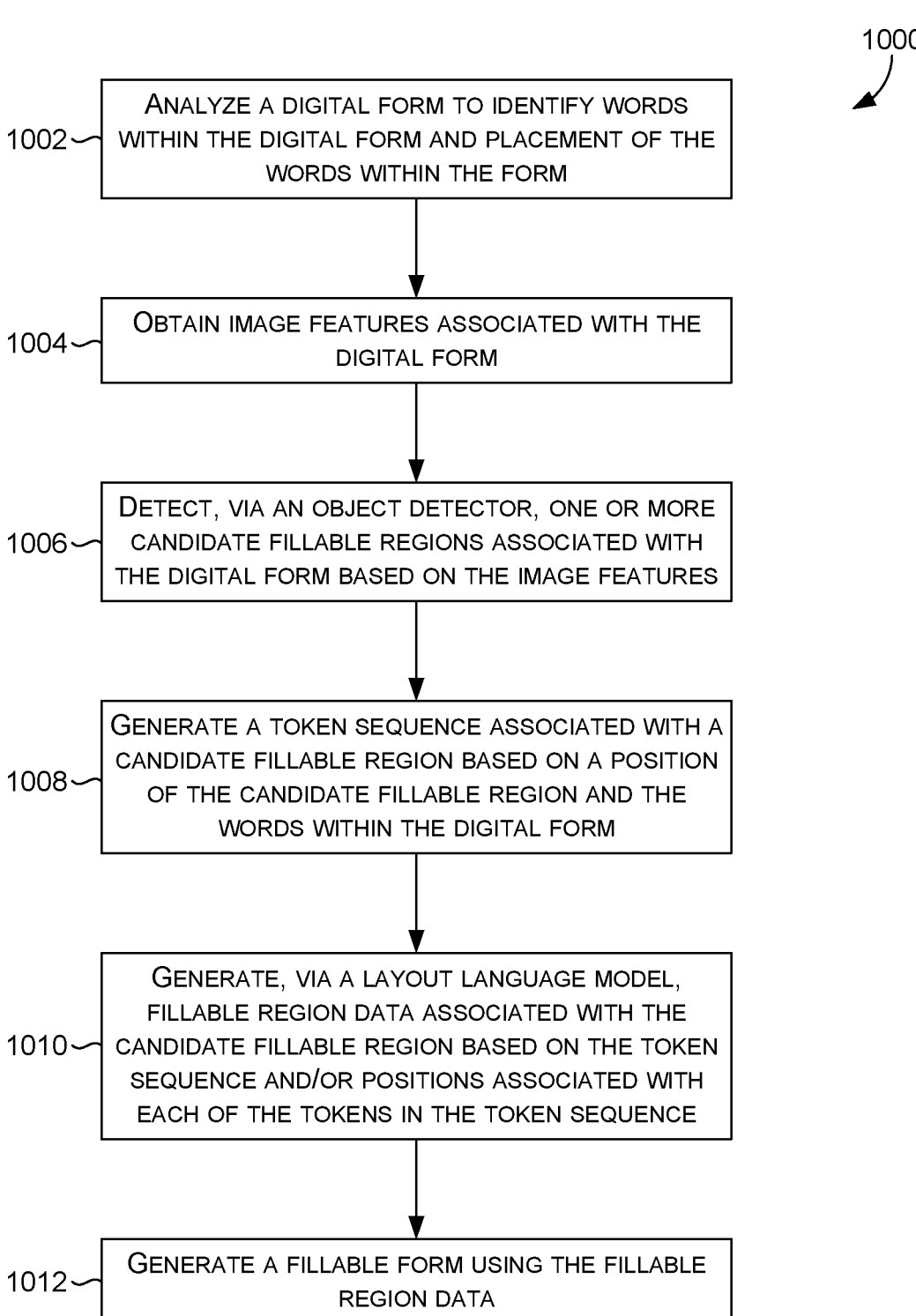

1000

1002 — ANALYZE A DIGITAL FORM TO IDENTIFY WORDS WITHIN THE DIGITAL FORM AND PLACEMENT OF THE WORDS WITHIN THE FORM

1004 — OBTAIN IMAGE FEATURES ASSOCIATED WITH THE DIGITAL FORM

1006 — DETECT, VIA AN OBJECT DETECTOR, ONE OR MORE CANDIDATE FILLABLE REGIONS ASSOCIATED WITH THE DIGITAL FORM BASED ON THE IMAGE FEATURES

1008 — GENERATE A TOKEN SEQUENCE ASSOCIATED WITH A CANDIDATE FILLABLE REGION BASED ON A POSITION OF THE CANDIDATE FILLABLE REGION AND THE WORDS WITHIN THE DIGITAL FORM

1010 — GENERATE, VIA A LAYOUT LANGUAGE MODEL, FILLABLE REGION DATA ASSOCIATED WITH THE CANDIDATE FILLABLE REGION BASED ON THE TOKEN SEQUENCE AND/OR POSITIONS ASSOCIATED WITH EACH OF THE TOKENS IN THE TOKEN SEQUENCE

1012 — GENERATE A FILLABLE FORM USING THE FILLABLE REGION DATA

FIG. 10

FACILITATING IDENTIFICATION OF FILLABLE REGIONS IN A FORM

BACKGROUND

The digital form authoring process generally used to create a fillable version of a form is manual. In particular, form authoring workflows typically include localizing rectangular regions corresponding to fillable form fields, identifying field labels, assigning field types, and/or grouping fillable form fields (e.g., into checkbox or radio-button groups). Form field authoring that involves such manual creation of the desired fields and field types, however, is tedious, time-consuming, and error-prone. Although some technical advances have been made using computer vision techniques to create fillable boxes within forms, such conventional techniques can be deficient.

SUMMARY

Embodiments described herein are directed to facilitating identification of fillable regions and data associated therewith. In this regard, for an electronic form or document, fillable regions and data associated therewith can be identified and/or generated in an accurate and efficient manner. In particular, embodiments described herein analyze candidate fillable regions (e.g., predicted via an object detector) in association with corresponding textual context and spatial context to generate fillable region data. Advantageously, utilizing textual context and spatial context to generate fillable region data enables identification of more accurate data as the context surrounding a candidate fillable region is taken into account. A more accurate identification of fillable region data enables generation of a more user-friendly digital fillable form. In particular, the fillable regions included in a digital fillable form are more likely to be accurately positioned, classified, grouped, etc., thereby resulting in less modifications required by a user and less resources of a computing device.

BRIEF DESCRIPTION OF THE DRAWINGS

FIG. 4 provides an example output associated with an object detector, in accordance with embodiments of the present disclosure.

FIG. 9 illustrates an example method for facilitating identification of form fillable regions and data associated therewith, in accordance with embodiments of the present technology.

FIG. 10 illustrates another example method for facilitating identification of form fillable regions and data associated therewith, in accordance with embodiments of the present technology.

DETAILED DESCRIPTION

Figure 1:
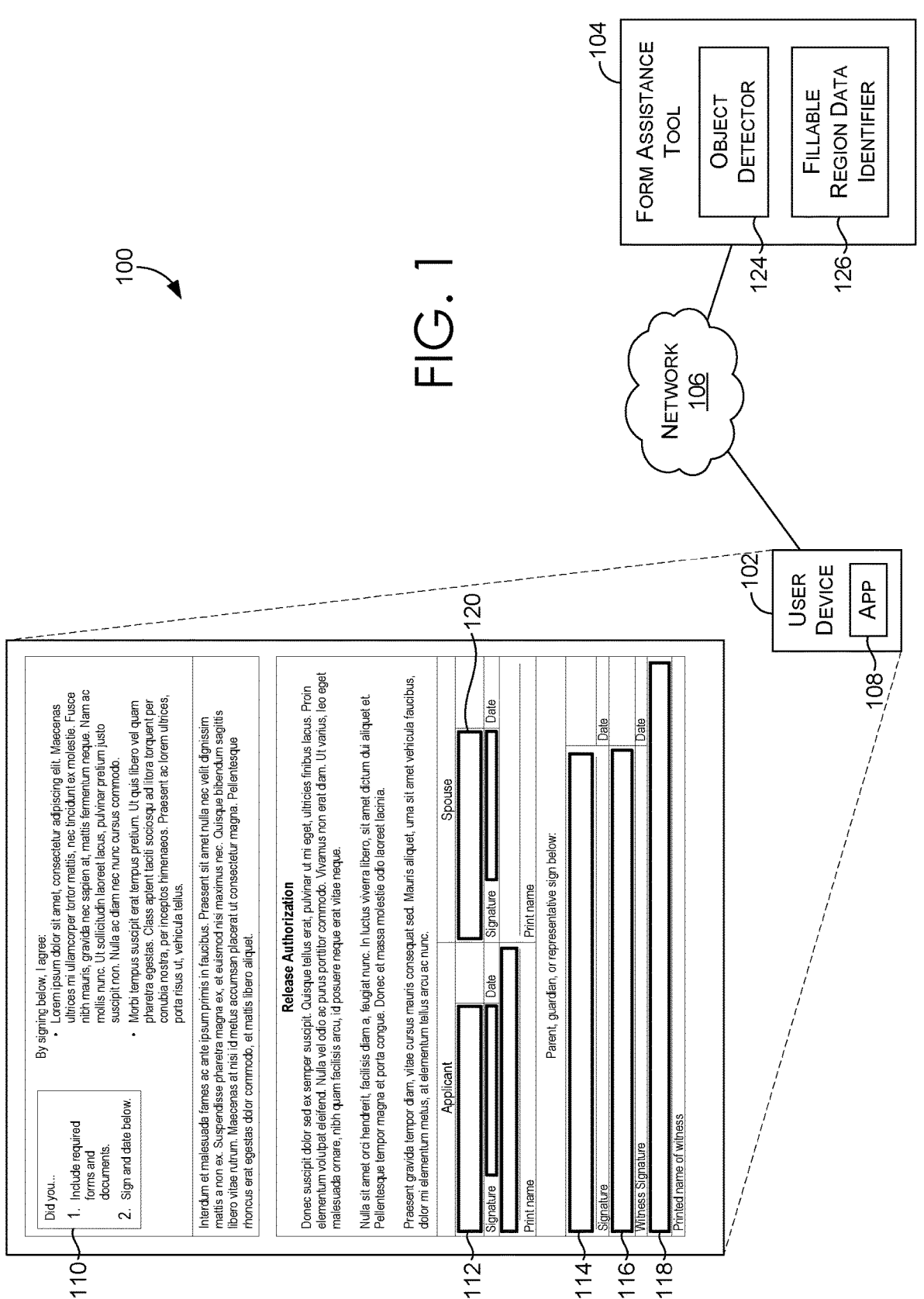
FIG. 1 depicts a diagram of an environment in which one or more embodiments of the present disclosure can be practiced.

It is generally desirable to have digital forms that are fillable such that information may be input into the fillable portions of the digital forms. In many cases, however, forms do not initially have fillable portions, and a user must manually create fillable portions on the form. In this regard, certain form filling or e-signature applications allow users to create fillable forms or digital documents (e.g., contracts) to be signed and/or otherwise filled with information. In some cases, an initiator will start with a paper document, digitize (e.g., scan, apply optical character recognition (OCR)) the paper document, and manually create the desired fields and field types, before inputting information into the form or sending the resulting digital form out to its recipient(s). In other cases, a user may want to fill out a digital form, but the form has not had the relevant fillable portions or fillable portion types created yet. The form may include underlined regions or bounding boxes, but there are many situations where there is no associated metadata that identifies a region as something to be filled in and/or that identifies the type of input data the region should accept.

Oftentimes, the digital form authoring process used to create a fillable version of a form is manual. To this end, form authoring workflows typically include localizing rectangular regions corresponding to fillable form fields, identifying field labels, assigning field types, and/or grouping fillable form fields (e.g., into checkbox or radio-button groups). Form field authoring that involves such manual creation of the desired fields and field types, however, is tedious, time-consuming, and error-prone. Further, such a manual form field authoring requires and consumes computing resources to navigate the document, identify each desired field, and assign a corresponding field type.

To provide some automation to such a manual authorization workflow, some conventional computer vision techniques are used to detect fillable fields. Although such conventional computer vision techniques can identify blank fillable boxes, such techniques can be deficient. For example, conventional computer vision techniques create fillable boxes in locations in which such fillable boxes should not exist and/or fail to create fillable boxes in locations in which such fillable boxes should exist. As another example, conventional computer vision techniques may not provide a classification label associated with a fillable box or may provide an incorrect classification label for a box. Based on these deficiencies, a user may be required to manually adjust or fix the initially detected fillable boxes. For instance, a user may need to reposition the fillable boxes, remove fillable boxes, add new fillable boxes, modify classification labels, add new classification labels, etc. Such manual fillable box modifications can also be tedious, time-consuming and error prone. Further, such a manual process also requires and consumes computing resources to navigate the document, identify the appropriate modifications, and make appropriate modifications.

Accordingly, embodiments of the present technology are directed to facilitating identification of fillable regions and data associated therewith. In this regard, for an electronic form or document, fillable regions and data associated therewith can be identified and/or generated in an accurate and efficient manner. In particular, embodiments described herein analyze candidate fillable regions in association with corresponding textual context and spatial context to generate fillable region data. Advantageously, utilizing textual context and spatial context to generate fillable region data enables identification of more accurate data as the context surrounding a candidate fillable region is taken into account. A more accurate identification of fillable region data enables generation of a more user-friendly digital fillable form. In particular, the fillable regions included in a digital fillable form are more likely to be accurately positioned, classified, grouped, etc., thereby resulting in less modifications required by a user and less resources of a computing device.

In operation, to efficiently and effectively generate or identify fillable region data for a form, candidate fillable regions are identified, for example, via an object detector. A fillable region generally refers to a region or area within an electronic form in which input (e.g., text) may be provided, but is currently void of input. A fillable region can be represented in any number of shapes, such as a rectangle, a square, a circle, a free-form shape, or other shapes. Candidate fillable regions are fillable regions that are candidates, or possible, fillable regions for including in an electronic form. In this regard, candidate fillable regions are empty space, that is, space on the form that is not currently filled with text. In embodiments, an object detector identifies candidate fillable regions based on image analysis, including visual features and linguistic features. Thereafter, a language model (e.g., layout or spatial language model) analyzes the candidate fillable regions along with textual context and spatial context to identify which of the candidate fillable regions to designate as a fillable region for the electronic form and/or to identify data associated therewith (e.g., type(s) of fillable region(s), groupings associated with fillable regions, etc.). As described herein, the layout language model may be trained to perform any of a number of tasks to identify various types of fillable region data.

As described herein, to generate fillable region data, the language model may take a token sequence as input to output fillable region data. A token sequence input generally includes a sequence of tokens, including text tokens and region tokens. A text token may represent a word in the form, and a region token may represent a candidate fillable region identified via an object detector. The text tokens and region tokens can be interleaved such that sequence represents a sequence reflected in the form. The order of the tokens can be identified using position data associated with the text in the document and the candidate fillable regions. In addition to the token sequence, the language model may analyze other types of data, such as spatial indicators, candidate region features, classification labels or types, and/or the like.

Advantageously, using a language model to identify fillable region data enables a more accurate identification of data as the language model incorporates textual and spatial context analysis. For example, in using a language model in addition to an object detector, more accurate or more specific fillable region data can be generated than can be generated using a conventional computer vision techniques to identify fillable regions. Additionally, such fillable region data may, for example, reclassify an initial classification label previously provided, provide additional fine-grained labels for candidate fillable regions, indicate redundant fillable fields, identify a grouping associated with candidate fillable regions to either improve precision (e.g., by correcting labels) or enrich the final output (e.g. with a group structure). In addition to use of a language model providing more accurate fillable region data, utilizing an object detector to generate candidate fillable regions for input to the language model reduces the quantity of potential fillable regions that would need to be analyzed by the language model, thereby resulting in a more efficient use of computing resources. In this way, the object detector reduces the number of candidate fillable regions to be considered or analyzed by the language model.

Turning to FIG. 1, FIG. 1 is a diagram of an environment 100 in which one or more embodiments of the present disclosure can be practiced. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 11.

It should be understood that operating environment 100 shown in FIG. 1 is an example of one suitable operating environment. Among other components not shown, operating environment 100 includes a user device 102, a form assistance tool 104, and a network 106. Each of the components shown in FIG. 1 may be implemented via any type of computing device, such as one or more of computing device 1100 described in connection to FIG. 11, for example. These components may communicate with each other via network 106, which may be wired, wireless, or both. Network 106 can include multiple networks, or a network of networks, but is shown in simple form so as not to obscure aspects of the present disclosure. By way of example, network 106 can include one or more wide area networks (WANs), one or more local area networks (LANs), one or more public networks such as the Internet, and/or one or more private networks. Where network 106 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 106 is not described in significant detail.

It should be understood that any number of devices, servers, and other components may be employed within operating environment 100 within the scope of the present disclosure. Each may comprise a single device or multiple devices cooperating in a distributed environment.

User device 102 can be any type of computing device capable of being operated by an entity (e.g., individual) associated with a form for which to identify fillable regions and/or data associated therewith (e.g., types of fillable regions). A fillable region generally refers to a region or area within a form in which an individual may input or enter data.

Figure 11:
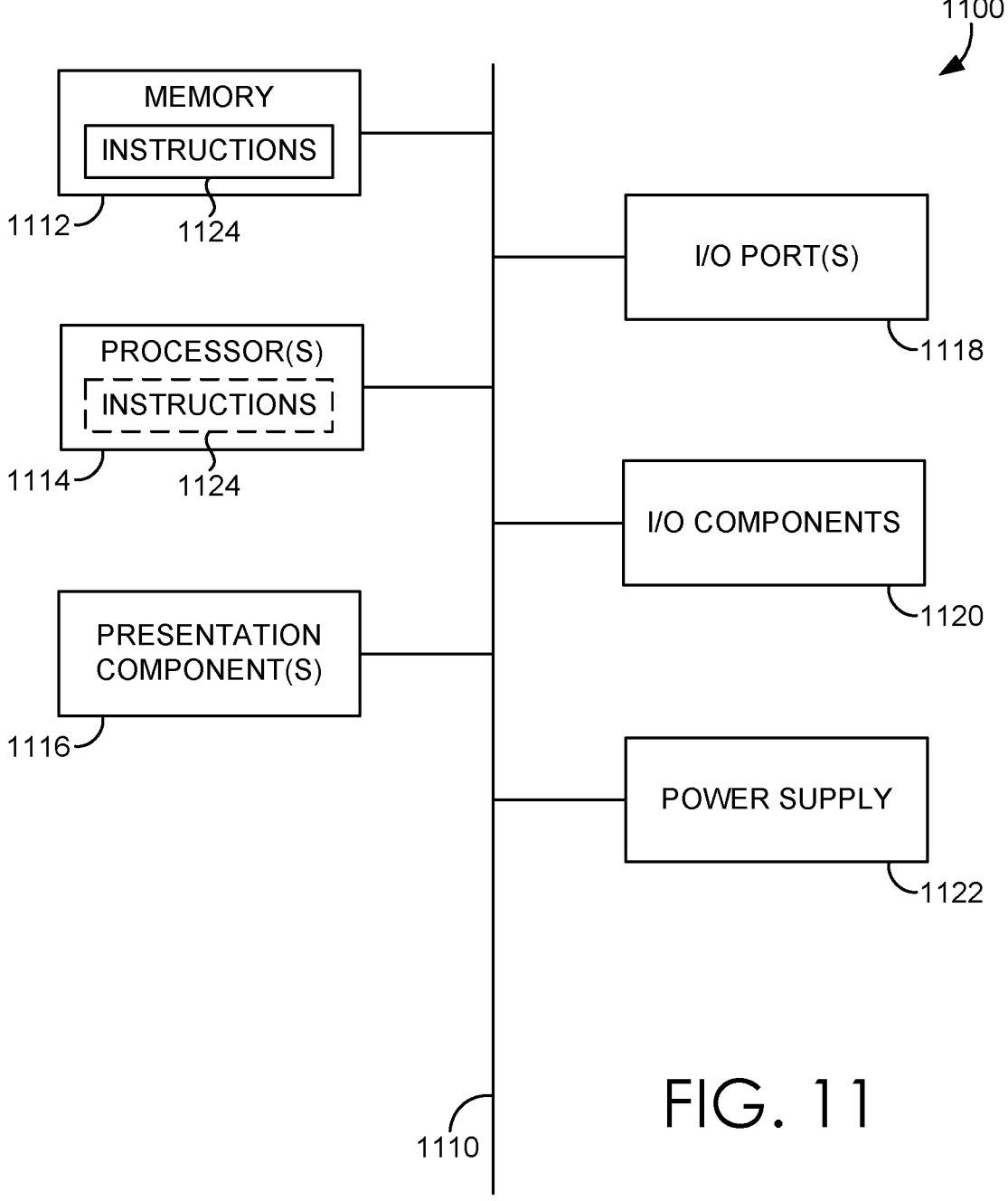
FIG. 11 is a block diagram of an example computing device in which embodiments of the present disclosure may be employed.

In some implementations, user device 102 is the type of computing device described in relation to FIG. 11. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors, and one or more computer-readable media. The computer-readable media may include computer-readable instructions executable by the one or more processors. The instructions may be embodied by one or more applications, such as application 108 shown in FIG. 1. Application 108 is referred to as a single application for simplicity, but its functionality can be embodied by one or more applications in practice.

The application(s) may generally be any application capable of facilitating the exchange of information between the user device 102 and the form assistance tool 104 in carrying out fillable region data identification. In some implementations, the application(s) comprises a web application, which can run in a web browser, and could be hosted at least partially on the server-side of environment 100. In addition, or instead, the application(s) can comprise a dedicated application, such as an application being supported by the user device 102 and the form assistance tool 104. In some cases, the application is integrated into the operating system (e.g., as a service). It is therefore contemplated herein that "application" be interpreted broadly. Some example applications include ADOBE® SIGN, a cloud-based e-signature service, and ADOBE ACROBAT®, which allows users to view, create, manipulate, print, and manage documents.

In accordance with embodiments herein, the application 108 can facilitate identification of fillable region data. For example, user device 102 may provide a form for which fillable regions can be identified. Although, in some embodiments, a user device 102 may provide a form, embodiments described herein are not limited hereto. For example, in some cases, an indication of a form may be provided via the user device 102 and, in such cases, the form assistance tool 104 may obtain such a form from another data source (e.g., a data store).

The form assistance tool 104 is generally configured to generate or predict fillable region data. Fillable region data generally refers to any data associated with a fillable region. In some cases, the fillable region data may indicate a fillable region location. In other cases, the fillable region data may indicate a type of a fillable region, a sub-type of a fillable region, a redundancy associated with a fillable region, a grouping associated with a fillable region, or the like.

At a high level, to generate fillable region data, the form assistance tool 104 includes an object detector 124 and a fillable region data identifier 126. The object detector 124 may be or include a visual machine learning model that analyzes forms in the form of images. For example, the object detector 124 may obtain a raw image of the form and a linguistic image of the form that indicates placement of text in the form. The object detector 124 can use such images to predict a candidate fillable region. In some cases, the object detector 124 also predicts a type or classification of the candidate fillable region. Examples of types of candidate fillable regions include, for instance, signatures, text, checkboxes, and non-fillable regions.

The predicted candidate fillable region, and in some cases corresponding types, can be provided as input to the fillable region data identifier 126. The fillable region data identifier 126 can be or include a machine learning model, such as a layout machine learning model, to generate fillable region data. Such a machine learning model can take the input from the object detector 124 as well as textual context indicating text in the form and spatial context indicating positions of the text in the form to generate the fillable region data. In this way, the fillable region data identifier 126 utilizes textual and spatial context to generate accurate fillable region data.

In some embodiments, a token sequence may be used as input to a machine learning model of the fillable region data identifier 126. A token sequence input may include a sequence of text tokens representing text in a form and region tokens representing a candidate fillable region. Generally, the order of tokens in the sequence is based on the order of the text and candidate fillable regions placement in the form, such that the region token(s) is interleaved within the text tokens in a way that represents positioning in the form.

The machine learning model may be trained to perform a number of tasks to generate fillable region data. For example, in some embodiments, a machine learning model may be trained to confirm or correct a type of fillable region identified for a candidate fillable region. For instance, assume object detector 124 generates a predicted type of fillable region for a candidate fillable region. In such a case, the fillable region data identifier 126 can also predict a type of fillable region for the candidate fillable region based on data obtained from the object detector 124 (e.g., the candidate fillable region) as well as textual and spatial context. The newly predicted type of fillable region can then be compared to the type of fillable region predicted by the object detector 124 and used to modify to the new predicted type, if needed.

As another example, a machine learning model may be trained to generate a sub-type of fillable region identified for a candidate fillable region. For instance, assume object detector 124 generates a predicted type of fillable region for a candidate fillable region. In such a case, the fillable region data identifier 126 can predict a sub-type of fillable region for the candidate fillable region based on the data obtained from the object detector as well as textual and spatial context. By way of example only, assume object detector predicts a text type of fillable region. In such a case, the fillable region data identifier 126 may predict a phone number, an address, or a name as a more specific type of text.

As yet another example, a machine learning model may be trained to generate fillable region data that indicates duplicative fillable regions. In this way, in cases in which a candidate fillable region is a duplicate of another candidate fillable region, one of the candidate fillable regions may be suppressed such that it is not presented in the form for a user to provide input.

As another example, a machine learning model may be trained to generate fillable region data that indicates grouping associated with a candidate fillable region. For example, one candidate fillable region may be identified to be grouped with another candidate fillable region. Such a grouping can be used in generating a fillable form, for example, by making grouped candidate fillable regions mutually exclusive or to improve precision by correcting types associated with candidate fillable regions.

In embodiments, the form assistance tool 104 uses the fillable region data to generate a fillable form. For example, data related to position or placement of the fillable regions can be used to position or place the fillable regions in the form. As another example, types or sub-types can be used to provide descriptions of the type of data to input into a fillable region (e.g., via presentation on the form or via metadata associated with the form). As yet another example, duplicative fillable regions may be removed or suppressed such that the accurately predicted fillable regions are presented. Groupings of data may also be used to present the data. For instance, in cases that a set of fillable regions are identified as a group associated with a particular question, the fillable regions may be presented as mutually exclusive fillable regions such that only one fillable region can accept input at a time.

Such a fillable form can be provided to the user device 102, or another device, for presentation to a form recipient. As shown in FIG. 1, an example fillable form 110 can be presented via a user device. Fillable form 110 may include any number of fillable regions, such as fillable regions 112, 114, 116, 118, and 120. As such, the fillable form may be ready to receive or accept input in each of the fillable regions. Using conventional technologies, additional or alternative fillable regions may have been incorrectly identified and presented to the user, thereby utilizing unnecessary resources to correct or modify the fillable form.

For cloud-based implementations, the instructions on form assistance tool 104 may implement one or more components of form assistance tool, and application 108 may be utilized to interface with the functionality implemented on form assistance tool 104. In some cases, the components, or portion thereof, of form assistance tool 104 may be implemented on a user device or other system or device. Thus, it should be appreciated that the form assistance tool 104 may be provided via multiple devices arranged in a distributed environment that collectively provide the functionality described herein. Additionally, other components not shown may also be included within the distributed environment.

Figure 2:
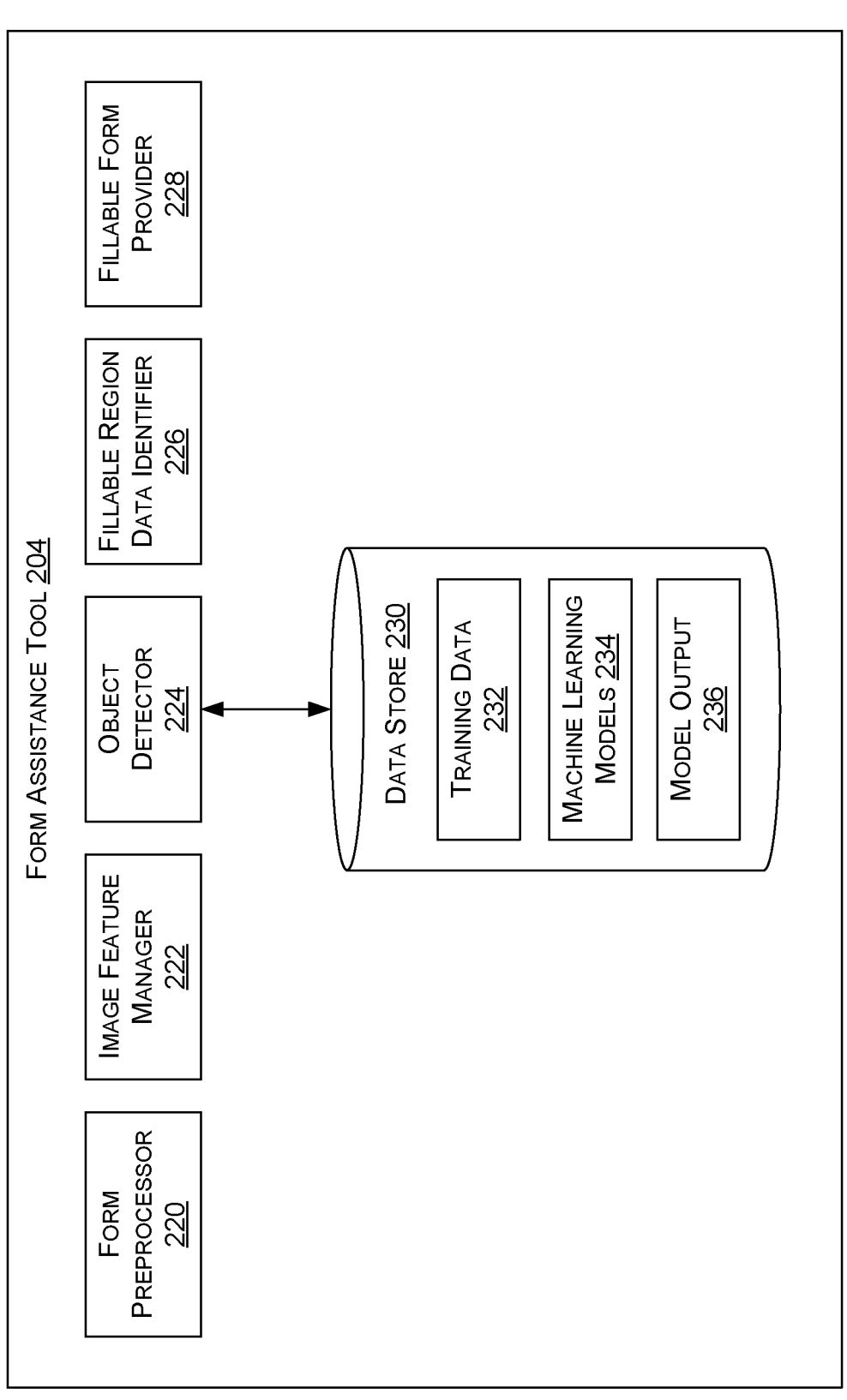
FIG. 2 depicts an illustrative form assistance tool, in accordance with various embodiments of the present disclosure.

Referring to FIG. 2, aspects of an illustrative form assistance tool are shown, in accordance with various embodiments of the present disclosure. Form assistance tool 204 includes a form preprocessor 220, an image feature manager 222, an object detector 224, a fillable region data identifier 226, a fillable form generator 228, and data store 230. The foregoing components of form assistance tool 204 can be implemented, for example, in operating environment 100 of FIG. 1.

Data store 230 can store computer instructions (e.g., software program instructions, routines, or services), data, and/or models used in embodiments described herein. In some implementations, data store 230 stores information or data received via the various components of form preprocessor 220, image feature manager 222, object detector 224, fillable region data identifier 226, and/or fillable form generator 228 and provides the various components with access to that information or data, as needed. Although depicted as a single component, data store 230 may be embodied as one or more data stores. Further, the information in data store 230 may be distributed in any suitable manner across one or more data stores for storage (which may be hosted externally).

In embodiments, data stored in data store 230 includes training data 232. Training data generally refers to data used to train a machine learning model, or portion thereof. As such, training data 262 can include images, image features, candidate fillable regions, textual context, spatial context, candidate region features, type of candidate region, and/or the like. Data store 230 can also be used to store machine learning models 234, or a portion(s) thereof. Data store 230 may also store output 236 from machine learning models, which may include any output, such as a fillable region data. Any other data computed by or used by form assistance tool 204 and/or aspects associated therewith, may be stored in data store 230 or any other data store accessible to the form assistance tool 204.

The form preprocessor 220 is generally configured to preprocess forms for which fillable regions are to be identified and/or generated. In particular, the form preprocessor 220 generally obtains or identifies textual context within the form and/or corresponding spatial context of the text. Textual context generally includes the actual text, such as words, in a form. Spatial context generally refers to any indication of a spatial position associated with text, such as a word. Spatial context may be in the form of a bounding box, or bounding box data (also referred to herein as word bounding boxes). Bounding box data may indicate a bounding box using coordinates of the bounding box.

To identify textual and/or spatial context of a form, the form preprocessor 220 can obtain a digital form for analysis. A digital form may be provided, for example, from a user device via an application, such as application 108 of FIG. 1. In other cases, a user of a user device may provide an indication of a digital form for which fillable region detection is desired. In such a case, the form preprocessor 220 may access the specified digital form, for example, via data store 230.

In some cases, the form preprocessor 220 may extract textual context (e.g., words) and spatial context (e.g., word bounding boxes) directly from the digital form. For example, in cases in which a form is a digital portable document format (PDF), words and corresponding bounding boxes can be directly extracted from the form. In other cases, the form preprocessor 220 may perform optical character recognition (OCR) and, thereafter, obtain textual context (e.g., words) and corresponding spatial context (e.g., bounding boxes). For instance, in cases in which a form is a scanned form, OCR may be performed on the scanned form. Upon performing OCR of the scanned form, words and corresponding bounding boxes can be identified therefrom.

Generally, OCR and PDFs encode such contextual information. Accordingly, textual context and/or spatial context can be extracted or obtained from such OCR or PDF forms. For instance, each character and/or word can have a spatial coordinate indicating a location at which to draw the letter or word on a document. In cases in which only character bounding boxes are identified via OCR or PDF, an algorithm or heuristics technique may be performed to merge the character bounding boxes into appropriate word bounding boxes to thereby obtain spatial context for words in the form.

The image feature manager 222 is generally configured to manage image features. In this regard, the image feature manager 222 may obtain or generate image features and provide such image features to the object detector 224. An image features generally refer to any feature associated with an image of a form. Image features may include visual features and/or linguistic features.

A visual feature generally refers to a feature associated with a visual aspect of a form. In one embodiment, a visual feature is an image of a form. In this regard, a visual feature may be a rendered raw image that is used as the visual input to the object detector. For example, a visual feature may be pixels rendered as a W×H×1 dimension grey-scale image.

As another example, a visual feature may be pixels rendered as a W×H×3 dimension RGB-scale image. Accordingly, the image feature manager 222 may obtain or generate a raw image of a form (e.g., via a data store or user device) and provide the image to the object detector 224.

A linguistic feature generally refers to a feature associated with language or words. In embodiments, the object detector 224 operates using images as input. As such, the linguistic feature may be in the form of an image. To generate or obtain a linguistic feature, the image feature manager 222 may use or access a language model. A language model can generally take text (e.g., words) as input and generate corresponding feature vectors.

Any type of language model may be used. For instance, a language model may be a bidirectional encoder representations from transforms (BERT) language model, a word-grid language model, a character-grid language model, or the like. Such language models may be pre-trained. A BERT language model may take a word(s) as input and output a feature vector (e.g., a fixed-length feature vector) that can be input to the image in association with that word. For example, for each word in a digital form, BERT can provide a 120-dimensional feature vector (a set of real numbers) for that word. Each 120-dimensional feature vector can then be positioned at the spatial location of the word. Similarly, with a character-grid language model, a feature vector can be generated for a character and used to replace the pixels at the location with the feature vector representing the character. With a text-grid language model, a feature vector can be generated for a word and used to replace the corresponding pixels at the location of the word with the feature vector representing the word.

As such, the image feature manager 222 can take the feature vectors generated via a language model (e.g., BERT, word-grid, and/or character-grid language models) and place the vectors in an image (e.g., original image) to generate an image having linguistic features, which may also be referred to as a linguistic image. Such a linguistic image may represent linguistic features by indicating locations of words (and may include additional information as to the meaning or understanding of the word) and locations void of any text. In this way, linguistic features are computed yielding a d-dimensional vector for each token. W×H×d dimensional image feature maps can be constructed from these vectors, for example, by filling in regions corresponding to word bounding boxes with the corresponding d-dimensional feature, leaving zeros in the remaining locations. Upon obtaining linguistic features (e.g., represented via a linguistic image), the image feature manager 222 can provide the linguistic features to the object detector 224.

In some embodiments, the image feature manager 222 may aggregate or stack the visual features (e.g., represented via a raw image) and linguistic features (e.g., represented via a linguistic image) into a tensor W×H×(d+1) tensor that serves as a combined input into the object detector 222. In this regard, the image feature manager 222 may combine the visual features and linguistic features associated with an image to provide an aggregated input for the image to the object detector 222.

The object detector 224 is generally configured to detect candidate regions, such as candidate fillable regions. An object detector may be a single-shot object detector that processes an image of a page using a convolutional neural network and outputs a representation of placement and size of predicted regions (e.g., candidate fillable regions) in the page. Any region detection technique is contemplated within the scope of the present disclosure.

The object detector 224 can predict candidate regions within a form. Generally, the object detector 224 detects or predicts candidate fillable regions. As described, a fillable region generally refers to a region or area in a form in which a user may provide input, that is, the region is capable of being filled with input, such as text. A candidate fillable region refers to a potential fillable region of a form. In addition to predicting candidate fillable regions, the object detector 224 can predict probabilities associated with various classifications. A candidate fillable region may be represented as box $b=(x_1, y_1, x_2, y_2, p_1, \ldots p_c)$, where each probability $p_i$ represents a probability that the box b is of type i. Example fillable region types or classifications may include a checkbox, a signature, a text, a non-fillable region, etc.

Additionally or alternatively to predicting candidate fillable regions, the object detector 224 may predict other candidate regions, such as candidate label regions, candidate field region, candidate grouping region (e.g., candidate field groupings), etc. A candidate label region generally refers to a region that represents a potential or candidate label. A label refers to text on a form that represents a label or description of a potential fillable region. A candidate field region generally refers to a region that represents a potential or candidate field. A field generally refers to a combination of a label and a fillable region (or candidate label and fillable region). A candidate grouping region generally refers to a region that represents a potential or candidate grouping region. A grouping region may be a group or combination of items that are identified as belonging together. A group of items may be a group of fields, a group of text labels, a group of fillable regions, etc. For example, a candidate field grouping refers to a grouping of candidate field regions.

Figure 3:
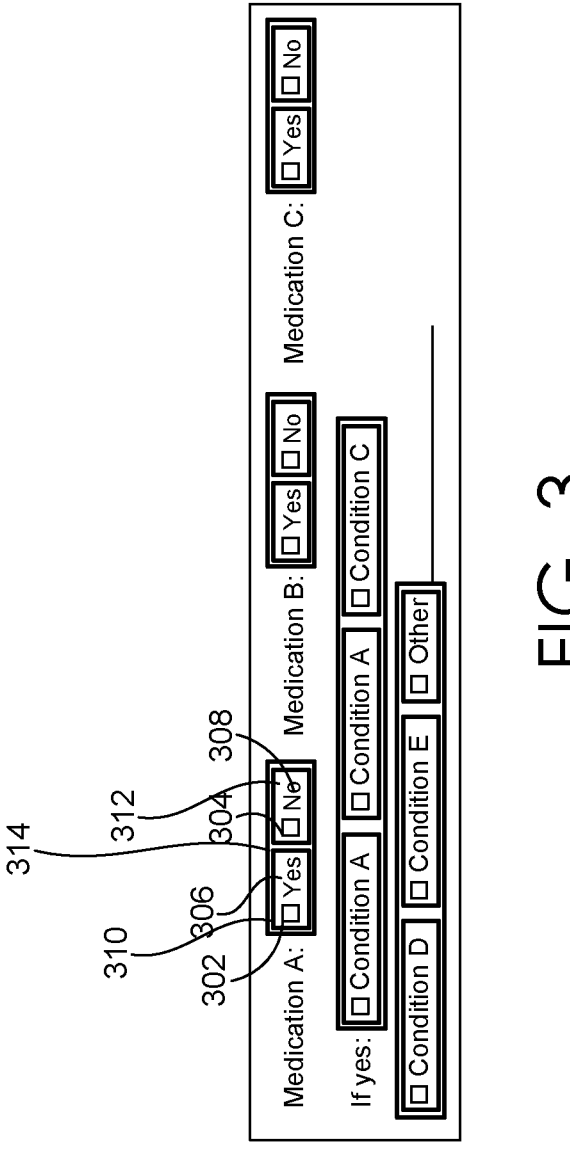
FIG. 3 depicts example candidate regions, in accordance with various embodiments of the present disclosure.

Such candidate regions may be any region or area that encloses the corresponding field, label, grouping, etc. For example, the candidate region may be in the shape of a rectangle or box that encloses a field having a label and a fillable region. By way of example only, and with reference to FIG. 3, the object detector 224 may detect candidate fillable region 302 and candidate fillable region 304, both of a checkbox fillable region type. The object detector 224 may also detect candidate label region 306 and candidate label region 308 encompassing the corresponding labels ("yes" and "no") for the candidate fillable regions 302 and 304, respectively. The object detector 224 can also detect candidate field region 310 that encloses the candidate fillable region 302 and the corresponding label region 306 as well as candidate field region 312 that encloses the candidate fillable region 304 and the corresponding label region 308. As yet another example, the object detector 224 can detect candidate grouping region 314 that encompasses the first candidate field region 310 and the second candidate field region 312 to aggregate the candidate field regions into a single group indicating that the two fillable regions belong together and are mutually exclusive choices.

The object detector 224 can be configured or trained to detect or identify any of such candidate regions. Further, as with the candidate fillable regions, the object detector 224 may, in some embodiments, generate probabilities associated with each candidate region.

To predict candidate regions, such as candidate fillable regions, the object detector 224 can analyze the input image features (e.g., in the form of an image(s)) and provide or output the candidate regions. As described, the candidate regions may be represented using candidate region indicators, including any indicator to indicate a candidate region, such as bounding boxes or indications thereof (e.g., bounding box coordinates). In addition to providing a candidate region(s), the object detector 224 can predict fillable region types and corresponding probabilities. Examples of fillable region types includes text, numeric, date, signature, checkbox, and/or non-fillable type or classification. As such, the output from the object detector 224 may include the positions or locations for each candidate fillable region as well as fillable region types and corresponding probabilities. As described, the output from the object detector 224 may additionally or alternatively include other candidate regions (e.g., label regions, field regions, group regions) and/or corresponding probabilities.

In some cases, the object detector 224 may use a threshold to remove some of the candidate regions. For example, candidate regions associated with a probability under 50% may be removed as a candidate region. A higher threshold may result in a high recall, and a lower threshold may result in false positives.

FIG. 4 provides one example illustrating example output associated with an object detector. As illustrated, FIG. 4 provides various examples of candidate regions identified. For example, candidate fillable regions 404, 406, and 408, among others, are identified on form 402. Candidate fillable region 404 is identified as a text type of fillable region. Candidate fillable region 406 is identified as a checkbox type of fillable region. Candidate fillable region 408 is identified as a signature type of fillable region. Other candidate regions identified are label regions, one of which is shown via bounding box 410. Although not shown, for each candidate fillable region, a probability may be determined for each possible type of a set of types. For example, assume a candidate fillable region may be of a checkbox type, a signature type, and non-fillable region type (i.e., indicating not a fillable region), the object detector may provide a probability associated with the checkbox type, a probability associated with the signature type, and a probability associated with non-fillable region type.

The object detector 224 may be in any form capable of generating or predicting candidate regions, such as candidate fillable regions. In this regard, the object detector 224 may be or use a machine learning model. Any type of machine learning model may be used to generate or predict candidate regions, and/or data associated therewith (e.g., type of fillable region). One example of a machine learning model that may be used is a convolutional neural network (CNN). Generally, a CNN is a neural network in which one or more layers use a convolution as a function applied to output the previous layer.

In training a machine learning model, such as a CNN, a dataset indicating ground truths is used. In this regard, the machine learning model may receive, as input, a set of image features and indications of candidate regions (e.g., fillable candidate regions). For example, the machine learning model may obtain a set of raw images with various regions identified as fillable regions and having an assigned or designated fillable region type (e.g., signature, text, checkbox, none). Such labels assigned or designated for the various fillable regions can generally specify the different types of fillable region types. For example, in cases that an obtained training dataset includes three fillable region types, those three fillable region types are the ones for which the object detector 224 generates predictions. The training labels may be provided in any number of ways. As one example, a human may label bounding boxes in a form in association with a particular type of fillable region. As another example, a human may subcategorize a bounding box into a set of labels (e.g., four labels). As yet another example, a ground truth is extracted from existing digital fillable forms in a repository.

In training the machine learning model, the model is trained to localize candidate regions, such as candidate fillable regions identified or represented via a bounding box, and provide a label. In cases in which the machine learning model predicts incorrectly or gives too much confidence to an incorrect class, an optimization algorithm, such as gradient descent, can be used to train the machine learning model by minimizing errors between the predicted and actual results. To this end, back propagation can be used to update weights of the machine learning model.

In addition to outputting a candidate region indicator (e.g., coordinates or bounding box associated with a candidate fillable region) and/or probabilities associated therewith (e.g., a probability for each candidate type for a candidate fillable region), the object detector 224 may also provide or be used to provide a candidate region feature. A candidate region feature, as used herein, generally refers to a feature associated with a candidate region predicted by the object detector. For example, assume an object detector predicts a particular candidate fillable region associated with a digital form. In such a case, one or more candidate region features may be identified in association with the particular candidate fillable region and provided to the fillable region data identifier 226.

In embodiments, the object detector (e.g., via a CNN) may be used to identify one or more candidate region features. As one example, prior to output of a candidate region indicator(s) and corresponding type probability(s), the object detector 224 may generate a feature vector(s) (e.g., a fixed length vector) that represents a visual appearance of the candidate region and/or surroundings of the candidate region. Such a feature vector(s) may be used by the object detector 224 to make the candidate region prediction. In this regard, a language model, such as language model 227, can obtain candidate region features that have been identified or generated via the object detector 224 (e.g., in association with a layer of a CNN), thereby providing a more meaningful feature set as input to the language model (as opposed to raw pixels). To obtain candidate region features for a candidate region, a tensor can be extracted in association with the candidate region. For example, a tensor can be extracted or identified via a layer, such as a last layer, of a CNN. In some cases, the tensor may correspond with the candidate region (e.g., candidate fillable region). In other cases, the tensor may correspond with the candidate region and additional context surrounding the candidate region or adjacent to the candidate region. Such a tensor can include a fixed-length feature vector that represents what is within the candidate region and, in some cases, surrounding context. Although such candidate region features are generally described herein as identified via a layer of a CNN, embodiments are not limited herein. For example, visual features may be raw pixels associated with a candidate region.

The fillable region data identifier 226 is generally configured to identify fillable region data. Fillable region data may include any type of data related to a candidate fillable region. By way of example only, and without limitation, fillable region data may include candidate region data, fine-grain type data, redundant data, group data, and/or the like. As one example, fillable region data may indicate whether a fillable region should exist at a particular location within a form. That is, fillable region data may indicate whether a candidate fillable region should be a fillable region on a digital form. As another example, fillable region data may indicate a type or class of a fillable region. For example, fillable region data may predict a type (e.g., course type) of fillable region to confirm or modify a previously predicted type of fillable region. As another example, fillable region data may predict a fine-tune type of fillable region to further specify a coarse type of fillable region. As yet another example, fillable region data may indicate whether fillable region is duplicative. As yet another example, fillable region data may indicate whether to group items associated with a fillable region(s).

To determine fillable region data, the fillable region data identifier 226 can perform textual and spatial context analysis in association with candidate fillable regions. In this way, for a particular candidate fillable region identified via the object detector 204, the fillable region data identifier 226 can analyze textual context and spatial context associated with the particular candidate fillable region to identify or determine fillable region data. Textual context analysis generally includes analysis of language associated with or corresponding with a candidate fillable region. In this way, language, or words, surrounding a candidate fillable region can be analyzed. Spatial context analysis generally includes analysis of space or layout associated with or corresponding with a candidate fillable region. To this end, spatial context or indicators associated with the candidate fillable region and/or other items, such as surrounding text, can be analyzed. Advantageously, using both textual context and spatial context analysis provides a more accurate identification of fillable region data. More accurate identification of fillable region data will facilitate reduction of user input and thereby reduce computing resources. For example, in addition to enhancing a user's ability to operate efficiently in terms of generating a fillable form, embodiments described herein will reduce the number of clicks or entries a computer user has to make, thereby resulting in reduction of memory utilization, CPU cycles, number of operations that need to be performed by the computer, power consumption, and the like.

As such, the fillable region data identifier 226 can obtain textual context and spatial context. As described, the textual context generally includes the actual text, such as words, in a document. Spatial context generally refers to any indication of a spatial position associated with text, such as a word. Spatial context may be in the form of a bounding box, or bounding box data (also referred to herein as word bounding boxes). Bounding box data may indicate a bounding box using coordinates of the bounding box. Such textual context and/or spatial context may be obtained, for example, from the form preprocessor 220.

The fillable region data identifier 226 can also obtain data from the object detector 224. In embodiments, the fillable region data identifier 226 obtains the candidate regions (e.g., candidate fillable regions). Such candidate region identification may include coordinates or bounding boxes, or other position indicators of candidate regions, produced by the object detector 224. In some cases, the fillable region data identifier 226 may filter out candidate regions that do not pass a particular threshold. Further, region types (e.g., types of fillable regions) may also be provided by the object detector 224 to the fillable region data identifier 226. As described, the object detector 224 may also provide candidate region features indicating features associated with candidate regions that can be used by the fillable region data identifier 226 to identify fillable region data. Additionally or alternatively, the fillable region identifier (e.g., via language model, such as a layout language model) may identify or generate visual features (e.g., using the bounding boxes of the candidate region(s) and/or words).

The fillable region data identifier 226 may include a language model 227 to perform such textual context and spatial context analysis. A language model may generally take textual context and spatial context as input and provide fillable region data as output. Generally, a language model includes any suitable language model that can evaluate a representation of textual and spatial context associated with a candidate fillable region (e.g., using attention to accumulate contextual signals from nearby tokens) and predict fillable region data (e.g., a fillable region types for a candidate fillable region from the encoded textual and spatial context). In an example implementation, language model 227 may be a layout or spatial language model (e.g., a transformer). For example, language model 227 may be in the form of LayoutLM or Layout-Aware language modeling using BERT (LAMBERT). Such language models may be trained for sequence labeling and/or sequence classification.

Advantageously, the language model 227 can perform linguistic analysis using the actual text or words to more accurately identify fillable region data, as opposed to using only an image in which words or text are positioned in a document. In this regard, the language model 227 can be trained to relate words to one another and have a deep linguistic understanding of actual words in the form. For instance, the language model 227 may be trained on millions of documents having words in a document related to each other to get a deeper understanding of the meaning of the words and placement with respect to each other.

In some embodiments, the language model accepts and processes a token sequence input(s). A token sequence input generally refers to a sequence of tokens. In embodiments, the token sequence input may be an encoded input representing a sequence of tokens representing textual context and a candidate region(s). In this way, the token sequence input can be analyzed and used to produce fillable region data.

In embodiments, the tokenized sequence input includes an aggregation or integration of tokens representing textual context and tokens representing a candidate region(s), such as a candidate fillable region(s). The text tokens generally represent or include text, or words, surrounding a candidate region (e.g., candidate fillable region). Text tokens can be generated based on the textual context obtained from the form preprocessor 220. The region token generally represents or includes an indication of a candidate region, such as a candidate fillable region. A region token may be represented in any number of ways. For example, a region token may be indicated as a special token using brackets, etc. In some cases, region tokens may be specified via the type of region being indicated. For example, a candidate fillable region may be represented using the term "widget," while a field, label, or group may be represented using other distinguishing terms or phrases. Region tokens can be generated based on the candidate region indicators obtained from the object detector 224. Text tokens and region tokens can be aggregated or interleaved into a tokenized sequence that may be input into a language model. In this regard, the region token representing a candidate region is surrounded by text tokens that surround the candidate region, in accordance with the layout of the form.

Accordingly, the fillable region data identifier 226 may generate tokenized sequences. Any number of tokenized sequences may be generated. In some cases, a single tokenized sequence may be generated for the entire form. In such cases, the sequence may be parsed into shorter sequences to satisfy a language model input length limit. In other cases, a tokenized sequence may be generated for each region token. In this regard, for each region token, text tokens corresponding with the region token may be included in the tokenized sequence. For example, a number (e.g., predetermined number) of text tokens existing before the region token and a number of text tokens existing after the region token may be used to generate a tokenized sequence. In yet other cases, a tokenized sequence may be generated for a set of region tokens (e.g., two region tokens, three region tokens, tokens on a single line of a form, tokens in a paragraph of a form). Tokenized sequences can be generated of any length and is not intended to be limited herein.

Generally, the region tokens are positioned within the tokenized sequence in an interleaved fashion with the surrounding text such that the region token representing a region is next to the text immediately surrounding the region in the form. For instance, a checkbox fillable region positioned next to a label "Yes" in a form might result in a tokenized sequence including region token representing the checkbox fillable region followed by a text token representing the label "Yes." Positioning or sequencing of the tokens, including the text tokens and the region tokens, can be determined using spatial indicators. For example, the spatial context associated with various words in the form provided via the form preprocessor may be used to identify locations of the text, and the candidate region indicators or position indicators provided via the object detector in association with the region may be used to identify locations of the fillable region. Such locations can then be used to sequence and interleave the region tokens and the text tokens.

Figure 5:
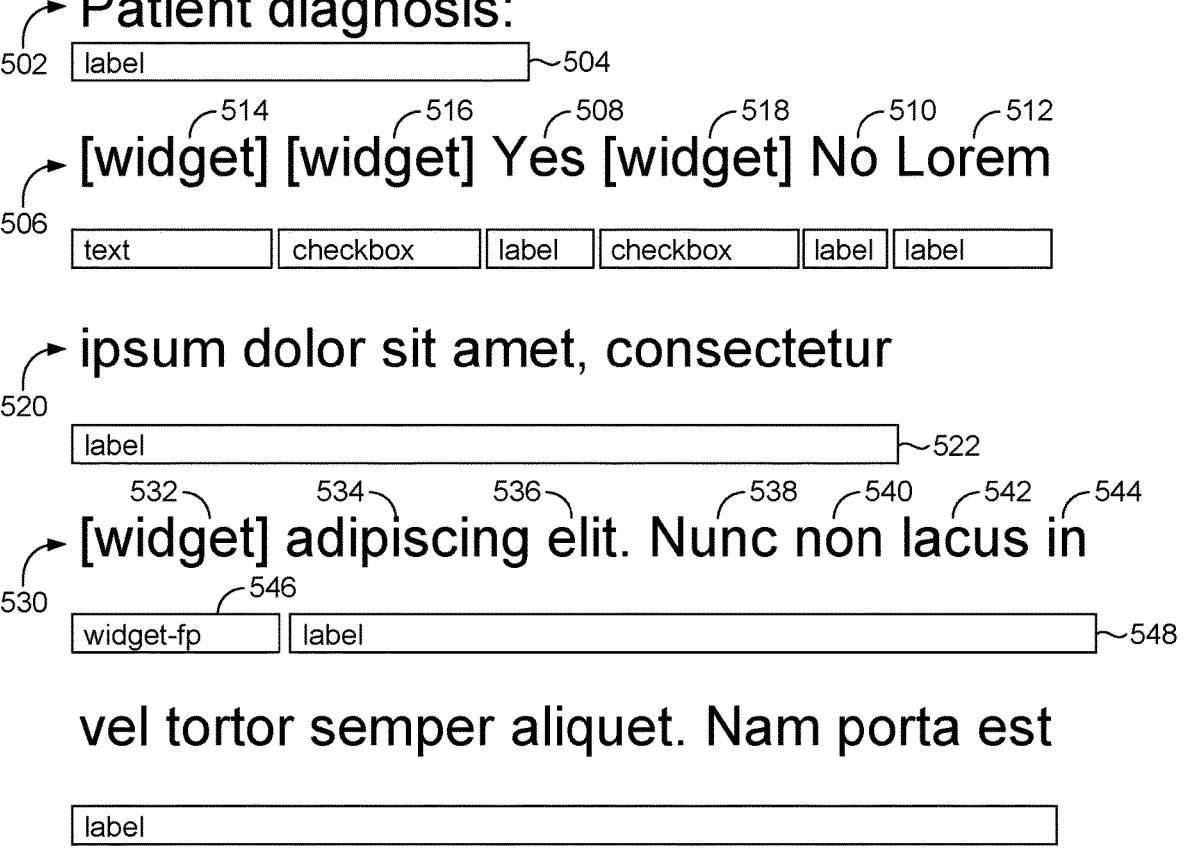
FIG. 5 illustrates an example of various tokenized sequence examples, in accordance with embodiments of the present technology.

By way of example only, and with reference to FIG. 5, various tokenized sequence examples are provided. Tokenized sequence 502 includes a series of text tokens, namely "Patient" and "diagnosis." Tokenized sequence 506 includes a series of text tokens and region tokens. In this example, text tokens 508, 510, and 512 are interleaved based on position in the form with the region tokens 514, 516, and 518. Turning to tokenized sequence 520, this sequence includes a series of text tokens. Tokenized sequence 530 includes a series of text tokens and region tokens. In this example, region token 532 precedes text tokens 534, 536, 538, 540, 542, and 544.

In addition to inputting the tokenized sequence(s) to the language model, other input may also be provided. For example, spatial indicators associated with each of the tokens can be provided (e.g., via spatial context for the text provided by the form preprocessor and/or candidate region indicators for the candidate regions provided by the object detector). In addition, types or classifications associated with each token, or particular tokens, may be provided. For example, in cases that a candidate fillable region is identified as a signature type, a signature type indicator may be provided in connection with the region token. Further, in some cases, the candidate region features identified via object detector 224 may also be provided as input for analysis.

The language model 227 uses the input to provide or output fillable region data. In some embodiments, the type of input and/or output may depend on the task to be performed. For instance, the language model 227 may perform sequence classification or sequence labeling. Sequence classification generally refers to providing a classification for an input sequence as a whole. For example, in performing a redundancy task, sequence labeling may occur as only one classification may be generated for the input sequence (e.g., including a pair of region tokens). Sequence labeling generally refers to providing a classification for various elements or tokens of an input sequence. In some cases, the language model may produce or output classifications for only the region tokens. In other cases, the language model may produce or output classifications for all tokens. In yet other cases, the language model may produce or output classifications for a particular type of region token (e.g., a fillable region, a field region, etc.).

By way of example, and with reference back to FIG. 5, various fillable region data associated with tokenized sequence examples are provided. A shown, in example tokenized sequence 502, a sequence classification label 504 is provided, indicating the tokenized sequence 502 is a label in association with a candidate fillable region. With respect to tokenized sequence 506, various classification are provided in association with tokens. For instance, a text classification is provided for region token 514, a checkbox classification is provided for region token 516, and a checkbox classification is provided for region token 518. With regard to the text tokens 508, 510, and 512, each of such tokens are classified as labels for candidate fillable regions. Turning to tokenized sequence 520, a sequence classification label 522 is provided, indicating the tokenized sequence 520 is a label in association with a candidate fillable region(s). In regard to tokenized sequence 530, which includes a series of text tokens and region tokens, various classifications are provided. As shown, classification 546 indicates the region token 532 represents a false positive fillable region or a non-fillable region, and classification 548 indicates the set of text tokens represent a label.

Returning to FIG. 2, as described, the language model 227 may be configured to perform various tasks, such as a classification correction task, a fine-grain classification task, a redundancy task, a grouping task, and/or the like. In embodiments, the language model uses textual and spatial analysis to analyze the context surrounding the candidate regions, such as candidate fillable regions, to perform tasks. Using textual and spatial analysis enables a more accurate prediction associated with candidate regions, such as candidate fillable regions.

At a high level, the language model 227 obtains the tokenized sequence representing text and a candidate region (s), such as a candidate fillable region, classifications associated with the tokenized sequence or a portion thereof (e.g., a type classification associated with a candidate fillable region and/or probability associated therewith), and/or spatial indicators indicating positions or locations of at least a portion of the tokens in the sequence. In addition, in some embodiments, or for some tasks, the language model 227 may also obtain candidate region features identified via the object detector 224.

A classification correction task generally refers to a task associated with correcting or confirming an identified candidate fillable region and/or a type associated therewith. In this regard, performing a classification correction task may result in output of fillable region data related to whether a fillable region should exist at a particular location within a form and/or a type or class of a fillable region. For example, fillable region data may predict a type (e.g., course type) of fillable region to confirm or modify a previously predicted type of fillable region (e.g., initially predicted via the object detector 224). In such cases, the fillable region types from which the language model 227 is performing classification may be the same as the fillable region types used for classifying via the object detector 224. For example, if object detector 224 is classifying based on a signature type, a checkbox type, and a non-fillable region type, then the language model 227 may also be performing classification based on the signature type, checkbox type, and non-fillable region type.

To output such data, the classification correction task may perform sequence labeling to provide a classification label for one or more tokens in an input sequence. For example, in some cases, a language model performing a classification correction task may output a classification or type for each region token in an input sequence. In other cases, a language model performing a classification correction task may output a classification for each region token and text token in an input sequence.

Such type or classification output as fillable region data may be provided to another component or used by the fillable region data identifier 226. For example, the fillable region data identifier 226, or another component, may compare the identified type of fillable region with a type of fillable region generated by the object detector 224. Based on a match of fillable region types, the candidate fillable region may be designated as a fillable region in the form and correspond with the confirmed type of fillable region. On the other hand, in cases in which the fillable types do not match, the candidate fillable region may be removed as a fillable region in association with the form or the fillable region may be assigned one of the fillable region types, such as the fillable region type identified via the fillable region data identifier 226.

A fine-grain classification task generally refers to a task associated with determining a more specific or fine-grain fillable region type or classification. To this end, performing a fine-grain classification task may result in output of fillable region data related to a sub-type of fillable region to further specify a broader or coarse type of fillable region. For example, assume an object detector 224 classifies a fillable region as a type of text. In this case, a fine-grain classification task may be performed to further clarify or refine a specific type of text, such as a data or a signature type. In such cases, the fillable region types from which the language model 227 is performing classification may be different from the fillable region types used for classifying via the object detector 224. For instance, the fine-grained fillable region types may be sub-types of the types used for classification via the object detector. 224. In this way, although the object detector 224 may classify a fillable region as a "text" fillable region type, the language model having a better understanding of the textual context may refine the classification to be a more specific type (e.g., address, phone number, name, etc.).

To output such data, the fine-grain classification task may perform sequence labeling to provide a classification label for one or more tokens in an input sequence. For example, in some cases, a language model performing a classification correction task may output a fine-grain or filtered classification or type for each region token in an input sequence (e.g., each region token previously classified in association with a coarse type).

Such fine-grain type or classification output as fillable region data may be provided to another component or used by the fillable region data identifier 226. In this regard, the fillable region data may be used to designate a fine-type classification for the corresponding candidate fillable region. In this way, when a fillable region is generated in a digital form, the fillable region can be assigned or designated a fine-type classification, for example, to provide a user an indication of a type of data to provide in the fillable region.

A redundancy task generally refers to a task associated with determining whether a candidate fillable region is redundant or duplicative to another candidate fillable region. By way of example only, in some cases, the object detector 224 may detect multiple candidate fillable regions in association with a label (e.g., a "signature" label). In such a case, however, only a single fillable region may be desired for a signature and the remaining fillable regions are duplicative. In order to avoid presenting multiple fillable regions to a user for providing input, fillable region data identifier may identify candidate fillable regions that are redundant such that the redundant candidate fillable regions are not presented to the user.

To perform a redundancy task, in some embodiments, the language model 227 may take an input sequence that includes a pair of region tokens representing different candidate fillable regions and text tokens represent text surrounding the pair of region tokens. The region tokens as input may be associated with a particular type or classification of the candidate fillable region (e.g., signature, checkbox, etc.).

In some cases, the redundancy task may result in output indicating types associated with the candidate fillable regions. For example, performing the redundancy task may result in correcting or modifying one of the candidate fillable region types. By way of example only, in cases in which both candidate fillable region types are initially identified as a "signature" type, performing the redundancy task may result in one of the candidate fillable region types being assigned the signature type and the other candidate fillable region type being modified, for instance, to a non-fillable region type or a text fillable region type.

In other cases, the redundancy task may result in output indicating whether the pair of candidate fillable regions can or should coexist in the form. In this regard, the redundancy task can identify which of fillable regions are redundant and should be suppressed.

The pairs of candidate fillable region selected for input sequences can be generated in any number of ways. As one example, all combinations of pairs of candidate fillable regions within a form can be used to generate various input sequences. In this way, the redundancy task can be performed for each pair of candidate fillable regions within a form, for example, to indicate whether a candidate fillable region is redundant. As another example, pairs of candidate fillable regions of a same type or classification may be generated. As yet another example, pairs of candidate fillable regions within a proximity or distance to one another may be generated.

In cases in which a candidate fillable region is identified as redundant (e.g., either a label is changed, for example, to non-fillable region, or the pair is indicated as unable to coexist in the form, a candidate fillable region may be suppressed from being presented to a user as a fillable region or reclassified (e.g., to a non-fillable region type or different type of fillable region). On the other hand, in cases in which the pair of candidate fillable regions are identified as allowed to coexist, the fillable regions can be both presented within the digital form.

In training a language model to perform the redundancy task, the input to the language model may include the ground truth and the predictions provided via an object detector. By way of example only, assume ground truth indicates there are two fillable regions in a form and an object detector predicts four candidate fillable regions in the form. Each set of pairs from the four candidate fillable region can be generated and used to create input sequences for training the layout model. In some cases, training the language model includes clustering. In this regard, each cluster may represent one ground truth. The predicted candidate fillable regions can be associated with a nearest ground truth to generate clusters. A pair of predicted candidate fillable regions within a cluster can be identified or labeled as suppressed, whereas a pair of predicted candidate fillable regions across clusters can be identified as labeled as allowed. Such labels can be used to train the language model to perform the redundancy task.

Figures 6A, 6B:
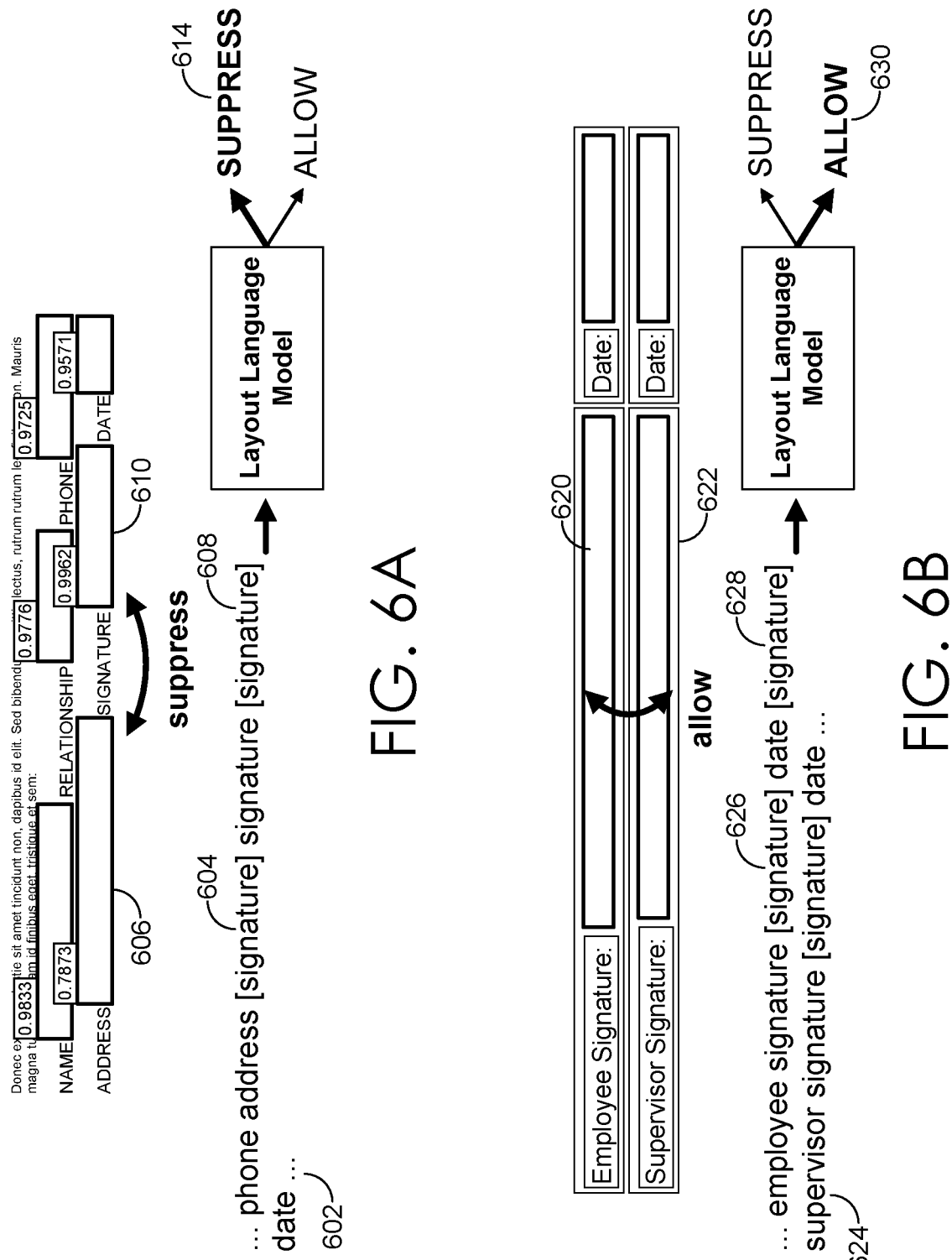
FIGS. 6A-6B provide examples related to performance of a redundancy task, in accordance with embodiments of the present technology.

FIG. 6A-6B provide examples related to performance of a redundancy task. With initial reference to FIG. 6A, assume tokenized sequence input 602 is provided to a language model, such as a layout language model. In this example, region token 604 represents candidate fillable region 606, and region token 608 represents candidate fillable region 610. Assume both candidate fillable region 606 and candidate fillable region 610 are both initially identified as being of a signature type classification (e.g., as identified from an object detector). For example, an object detector may have identified two candidate fillable regions for a particular label (e.g., "signature"). In this case, a tokenized sequence 602 is generated that includes a pair of signature type region tokens 604 and 608, which are interleaved with the surrounding text tokens. In executing the language model, the output provided in this example indicates to perform a suppression 614 in relation to the region token 604 and/or 606. As such, in one example, either candidate fillable region 606 and/or candidate fillable region 610 may be removed or suppressed as fillable regions. As another example, a classification type for one of the candidate fillable regions 606 and/or 610 may be modified. For instance, a classification type associated with candidate fillable region 606 may be modified to text, while the classification type associated with candidate fillable region 610 may remain as signature.

With reference to FIG. 6B, assume candidate fillable region 620 and 622 are initially identified (e.g., via an object detector) and both have a signature classification type. In this example, a tokenized sequence 624 is generated that includes a pair of signature type region tokens 626 and 628, which are interleaved with surrounding text tokens. In executing the language model, the output provided in this example indicates to allow 630 both candidate regions to coexist as fillable regions on a form.

A grouping task generally refers to task associated with determining candidate regions, labels, and/or fields that belong together as a group. By way of example only, assume a form includes a question which has multiple options for input. For instance, a "yes" and "no" checkbox may be presented or a set of multiple options may be presented. In such a case, it may be advantageous to designate the multiple fillable regions as a group, for example, to create a set of mutually exclusive fillable regions such that a user may only provide input into one of the fillable regions at a time. In this regard, assume a user initially selects the "yes" checkbox, and then desires to select the "no" checkbox. In this case, the "yes" may be automatically deselected when the "no" checkbox is selected, or the "no" checkbox may be prevented from selection until the user deselects the "yes" checkbox.

Figure 7:
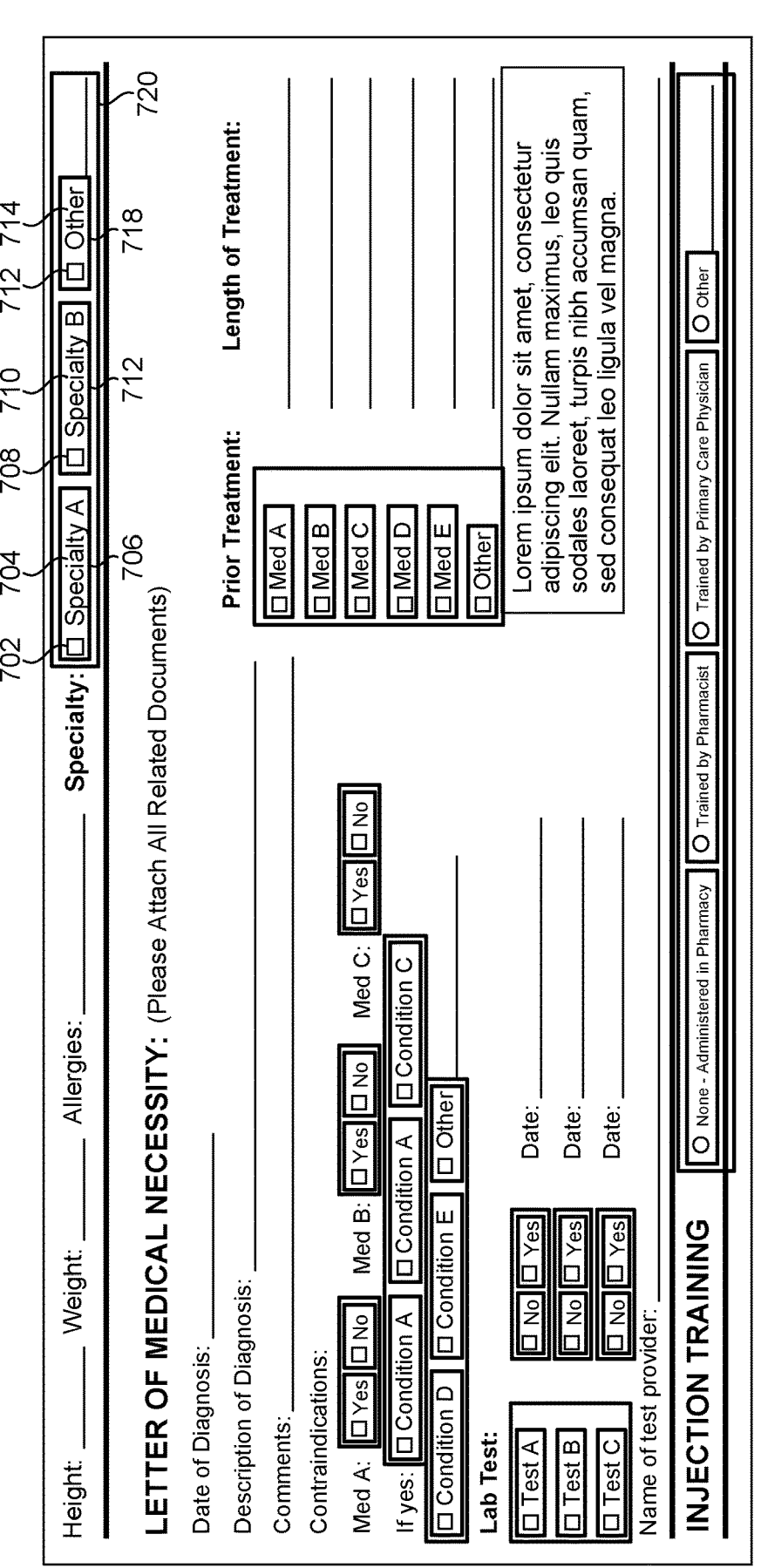
FIG. 7 provides one example of different groupings, in accordance with embodiments of the present technology.

By way of example and with reference to FIG. 7, FIG. 7 provides one example of different groupings. As shown in FIG. 7, a language model may identify candidate fillable region 702 and label 704 as a group 706. Similarly, candidate fillable region 708 and label 710 may be identified as a group 712, and candidate fillable region 714 and label 716 may be identified as a group 718. Further, the language model may identify groups 706, 712, and 718 as a grouping structure in association with the text "Specialty." Accordingly, in a fillable form, regions 706, 712, and 718 may be associated as a group 720 (e.g., in a nested structure) such that only one fillable region associated with the fields may be selected at a time.

Such a grouping task may be formed as a pair-wise problem, such that pairs of regions are provide as input into a language model. As one example, each of group 706, 712, and 718 may be analyzed in association with grouping 720 to predict whether the sub-group is associated with the grouping 720. As another example, each of groups 706, 712, and 718 may be analyzed with one another to identify whether the sub-groups belong to a same group. Based on the outputs, the grouping 720 can be formed. FIG. 7 illustrates additional groupings identified within the form.

Although only one language model 227 is illustrated, in implementation, any number of language models may be employed. For example, in some cases, each task described herein may correspond with a different trained language model. In this regard, to perform a redundancy task, a language model trained to identify redundancy may be used, while a language model trained to provide groupings may be used to perform a grouping task, and so on. In other cases, a language model may be trained to perform various tasks.

Language models performing different tasks may be uniquely trained to provide the desired output for the task. In this regard, the training data used to train the language models may be different and/or the language models may be trained to provide different output, depending on the task to be performed. For examples, labels used for training provided along with input data may be different depending on the task to be performed. In some cases, in language models trained to perform classification correction tasks and redundancy identification tasks, a same set of training data may be used. For instance, the training data may include identifications of fillable regions in forms and corresponding labels (e.g., types of fillable regions). Such identification of fillable regions and types of fillable regions may be indicated by humans and/or obtained from a repository of digital forms. In some embodiments, a ground truth used to train a language model to perform classification correction tasks and/or redundancy identification tasks may be the same as the ground truth used to train the object detector. The language model, however, may perform more accurately as the language model utilizes the spatial and textual context, thereby performing more effectively. In some cases, language models trained to perform fine-grained classification may use a different set of classification labels for training than that used for training a model performing classification correction. For example, manual label classifications may be provided to use in training for fine-grained classification.

Upon identifying fillable region data, the fillable form generator 228 is configured to use the data to automatically generate a fillable form in accordance with the fillable region data. In this regard, fillable regions can be generated on a digital form for use by a user to input information. The fillable regions can be positioned on the form in accordance with a location or position identified for the fillable region via the fillable region data identifier. In cases in which a candidate fillable region is identified as a duplicative, such an indication can be provided via the form or the fillable region can be automatically suppressed such that is not identified as a fillable region on the form. Groupings may be provided in any number of ways, including some visual indicator that multiple items belong together in a group (e.g., via color, style, etc.). Additionally, annotations or metadata may be included in association with the fillable regions. For example, types or classifications associated with the fillable regions may be included as metadata or, in some cases, presented via a display screen on the form. For example, types of fillable regions, sub-types of fillable regions, and/or groupings may be specified in connection with the fillable region.

The fillable form generator 228 can provide the fillable form to another computing device, such as user device 102 of FIG. 1. In this way, an entity requesting a conversion to a fillable form may receive the fillable form. An entity requesting a conversion to a fillable form may be a generator or distributor of the form that intends to distribute the fillable form to others to complete. In other cases, the fillable form requestor may be an individual that desires to complete the form.

Figure 8:
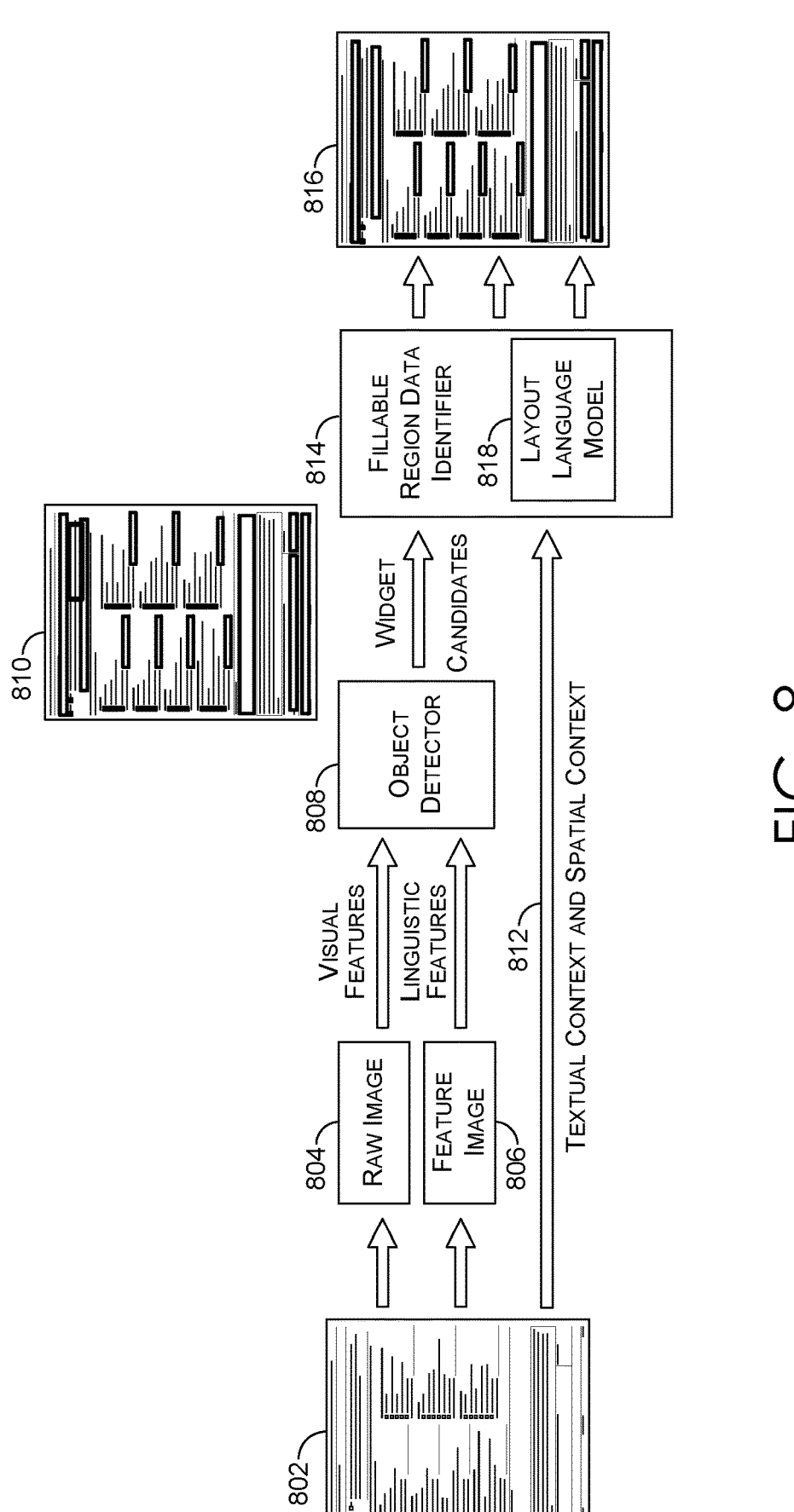
FIG. 8 provides an example process flow for performing identification of fillable regions and/or data associated therewith, in accordance with embodiments of the present technology.

FIG. 8 provides an example process flow for performing identification of fillable regions and/or data associated therewith. As shown in FIG. 8, a raw image 804 and a feature image 806 are generated from an obtained form 802. The feature image 806 may be generated to represent linguistic features of the form, such as placement of various words on the form. Both the raw image 804 and the feature image 806 can be provided as input to the object detector 808. The object detector 808 can analyze the raw image 804 and the feature image 806 and generate a set of candidate fillable regions. As one example illustrated in form 810, various candidate fillable regions can be identified. Such candidate fillable regions can be provided as input to the fillable region data identifier 814. In addition to the candidate fillable regions provided to the fillable region data identifier 814, textual context and spatial context 812 can also be provided. Such textual and spatial context can be obtained or derived from the form 802. The fillable region data identifier 814 can use such input data, for example, via a layout language model 818, to provide fillable region data, which can be used to generate a fillable form 816. Such fillable region data may be related to classification types, classification sub-types, duplicative regions, and/or grouping regions.

Turning now to FIGS. 9-10, FIGS. 9-10 provide illustrative flows of methods for facilitating identification of form fillable regions and data associated therewith. With reference initially to FIG. 9, a process flow is provided showing an embodiment of method 900 for generating fillable region data, in accordance with embodiments of the present technology.

Initially, at block 902, a form is obtained (e.g., a digital form). Such a form may be obtained in response to a user indication of a desire to generate a fillable form from the form.

At block 904, a candidate fillable region indicating a region in a form that is a candidate for being fillable is obtained. A candidate fillable region may be identified via a visual machine learning model, such as object detector 224 of FIG. 2. To identify a candidate fillable region, a visual machine learning model, or object detector, can analyze image features, such as a raw image (e.g., RGB image) and a linguistic image (e.g., image that represents text within a form). As described herein, the visual machine learning model may also generate or predict classification types of fillable regions (e.g., text, signature, checkboxes, non-fillable regions, etc.) and probabilities associated therewith. Such a visual machine learning model may also be used to identify various candidate region features (e.g., via a layer in the machine learning model).

At block 906, textual context indicating text from the form and spatial context indicating positions of the text within the form are obtained. Textual context generally refers to text in a form, and spatial context generally refers to positions or locations of text within the form (e.g., as identified via a bounding box or coordinates). Such textual context and spatial context can be identified or derived from the form.

At block 908, fillable region data associated with the candidate fillable region are generated, via a machine learning model, using the candidate fillable region, the textual context, and the spatial context. Advantageously, using the textual and spatial context in relation to the candidate fillable region provides a more accurate prediction of fillable region data. In this way, the actual text surrounding predicted candidate fillable regions is used to more accurately identify data associated with the candidate fillable region, including whether the fillable region should exist at such a location, a type of fillable region, etc. In embodiments, the machine learning model may also use candidate region features associated with the candidate fillable region to generate fillable region data. Fillable region data may include various types of data including, but not limited to, a type of fillable region, a sub-type of fillable region, a duplicative fillable region, a group of fillable regions, or a combination thereof.

At block 910, a fillable form having one or more fillable regions for accepting input is automatically generated using the fillable region data. In this regard, fillable regions can be created in a form for presenting to a user to input data into the fillable regions. Fillable region data can facilitate generation of the forms by indicating positions at which to generate fillable regions, classification types to associate with fillable regions, sub-types to associate with fillable regions, groupings to associate with fillable regions, suppression of duplicate fillable regions, and/or the like. By providing accurate fillable regions in a form, efficiency is increased for both the user and computing resources.

With reference to FIG. 10, FIG. 10 provides an example 1000 implementation for facilitating identification of form fillable regions and data associated therewith. Initially, at block 1002, a digital form is analyzed to identify words within the digital form and placement of the words within the form. At block 1004, image features associated with the digital form are obtained. Image features may be represented in the form of images. For example, a raw image may be obtained and a linguistic image may be obtained. A linguistic image may be generated based on analysis performed via BERT, word-grid, or character-grid, for example.

At block 1006, an object detector may detect one or more candidate fillable regions associated with the digital form based on the image features. In this way, an object detector may analyze the image features and generate or predict candidate fillable regions based on a visual analysis. In addition to predicting candidate fillable regions, corresponding types of candidate fillable regions and probabilities may also be predicted. For example, for a particular candidate fillable region, a probability that the candidate fillable region is of a signature type, a probability that the candidate fillable region is of a checkbox type, and a probability that the candidate fillable region is of a non-fillable region type may each be predicted. The object detector may also generate or identify candidate region features associated with candidate fillable regions. Such candidate region features may be identified.

At block 1008, a token sequence associated with a candidate fillable region is generated. A token sequence generally refers to a sequence of tokens including a region token representing the candidate fillable region and text tokens representing words from the form that surround the candidate fillable region. The sequence of the tokens can be determined based on a a position of the region and positions of the words within the form. A token sequence may include any number of tokens, including multiple region tokens.

At block 1010, a layout language model is used to generate fillable region data associated with the candidate fillable region based on the token sequence and/or positions associated with each of the tokens in the token sequence. The layout language model may utilize additional data to generate fillable region data, such as, but not limited to candidate region features, types of candidate fillable regions predicted by an object detector, and/or the like. The layout language model may be trained to generate various types of fillable region data. For instance, the language layout model may be trained to generate fillable region data that indicates a type of fillable region, a sub-type of fillable region, a grouping associated with a fillable region, an indication of a duplicate fillable region, etc.

At block 1012, the fillable region data is used to generate a fillable form. Such a fillable form includes one or more fillable regions for accepting input.

Having described embodiments of the present invention, FIG. 11 provides an example of a computing device in which embodiments of the present invention may be employed. Computing device 1100 includes bus 1110 that directly or indirectly couples the following devices: memory 1112, one or more processors 1114, one or more presentation components 1116, input/output (I/O) ports 1118, input/output components 1120, and illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 10 is merely illustrative of an exemplary computing device that can be used in connection with one or more embodiments of the present technology. Distinction is not made between such categories as "workstation," "server," "laptop," "handheld device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1112 includes computer storage media in the form of volatile and/or nonvolatile memory. As depicted, memory 1112 includes instructions 1124. Instructions 1124, when executed by processor(s) 1114 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. I/O components 1120 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 1100. Computing device 1100 may be equipped with depth cameras, such as stereoscopic camera systems, infrared camera systems, RGB camera systems, and combinations of these, for gesture detection and recognition. Additionally, computing device 1100 may be equipped with accelerometers or gyroscopes that enable detection of motion. The output of the accelerometers or gyroscopes may be provided to the display of computing device 1100 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A method comprising:
obtaining a candidate fillable region indicating a region in a form that is a candidate for being fillable, the candidate fillable region identified via a first machine learning model that analyzes images associated with the form;
obtaining textual context indicating text from the form and spatial context indicating positions of the text within the form;
generating a token sequence associated with the candidate fillable region using the textual context and the spatial context, wherein the token sequence comprises a region token representing the candidate fillable region and text tokens representing words from the form that surround the candidate fillable region, the region token and the text tokens being interleaved in the token sequence to represent a sequence of position data represented in the form, wherein an order of the region token and the text tokens for the token sequence is based on the position data associated with the text in the form and the candidate fillable region;
generating, via a second machine learning model, fillable region data associated with the candidate fillable region based on the token sequence provided as input to the second machine learning model, wherein the fillable region data comprises data indicating a type of content format for a fillable region, a sub-type of content related to the type of content format for the fillable region, a duplicative fillable region, or a combination thereof; and
using the fillable region data to automatically generate a fillable form that replicates content of the form and has one or more fillable regions for accepting input.

2. The method of claim 1, wherein the first machine learning model comprises a visual machine learning model.

3. The method of claim 1, wherein the images analyzed by the first machine learning model to identify the candidate fillable region include a raw image and a linguistic image that represents text within the form.

4. The method of claim 1, wherein the form is obtained in response to an indication of a desire to generate the fillable form from the form.

5. The method of claim 1 further comprising:
obtaining image features associated with the form; and
predicting, via the first machine learning model, the candidate fillable region and probabilities associated with a set of types of candidate fillable regions.

6. The method of claim 1, wherein the textual context and the spatial context is identified from the form.

7. The method of claim 1, wherein the textual context comprises words from the form, and the spatial context comprises bounding boxes or coordinates associated with the words.

8. The method of claim 1, wherein the second machine learning model further uses candidate region features associated with the candidate fillable region to generate the fillable region data, the candidate region features being generated via the first machine learning model used to identify the candidate fillable region.

9. The method of claim 1, wherein the fillable region data further comprises data indicating a group of fillable regions.

10. One or more non-transitory computer-readable storage media storing computer-executable instructions that, when executed by a processing device, cause the processing device to perform operations comprising:
obtaining a candidate fillable region indicating a position of a region in a form that is a candidate for being fillable, the candidate fillable region generated via a vision machine learning model that analyzes images associated with the form;
obtaining textual context indicating text from the form and spatial context indicating positions of the text within the form;
generating a token sequence associated with the candidate fillable region using the textual context and the spatial context, wherein the token sequence comprises a region token representing the candidate fillable region and text tokens representing words from the form that surround the candidate fillable region, the region token and the text tokens being interleaved in the token sequence, to represent a sequence represented in the form, based on position data associated with the text in the form and the candidate fillable region; and
inputting the token sequence into a layout machine learning model to generate fillable region data associated with the candidate fillable region using the token sequence and a type of content format for a fillable region identified via the vision machine learning model in association with the candidate fillable region.

11. The media of claim 10 further comprising using the fillable region data to automatically generate a fillable form having one or more fillable regions for accepting input.

12. The media of claim 10, wherein the candidate fillable region and the spatial context comprise indications of coordinates or bounding boxes.

13. The media of claim 10, wherein the layout machine learning model is trained to generate fillable region data that indicates a particular type of content format for the fillable region comprising a signature, a checkbox, a text, or a non-fillable region.

14. The media of claim 10, wherein the layout machine learning model is trained to generate fillable region data that indicates a duplicate fillable region.

15. The media of claim 10, wherein the layout machine learning model is trained to generate fillable region data that indicates a sub-type of fillable region specifying a sub-type of the type of content format for the fillable region generated via the vision machine learning model.

16. The media of claim 10, wherein the layout machine learning model is trained to generate fillable region data that indicates a grouping associated with the candidate fillable region, wherein the grouping comprises at least one other candidate fillable region, a field, or a label.

17. A system comprising one or more hardware processors and a memory component coupled to the one or more hardware processors, the one or more hardware processors to perform operations comprising:

obtaining a training dataset including a set of forms and training labels indicating positions of fillable regions, textual context indicating words in the set of forms, and spatial context indicating positions of the words in the set of forms; and training a language machine learning model to generate fillable region data associated with candidate fillable regions, within a form, predicted by a visual machine learning model, wherein the language machine learning model is trained using the training dataset including the set of forms and the training labels indicating the positions of fillable regions, the textual context indicating words in the set of forms, and the spatial context indicating positions of the words in the set of forms, and wherein the trained language machine learning model is used to generate fillable region data that indicates a type of content format for a fillable region, a sub-type of content related to the type of content format for the fillable region, a redundant fillable region, or a combination thereof based on an input token sequence associated with the fillable region, the input token sequence including a region token representing the fillable region interleaved with text tokens representing the words that surround the fillable region, wherein an order of the region token and the text tokens is based on position data of the words and the fillable region.

18. The system of claim 17, wherein the language machine learning model is further trained using types of fillable regions generated by the visual machine learning model or candidate region features generated by the visual machine learning model.

19. The system of claim 17, wherein the trained language machine learning model is used to generate fillable region data that further indicates a grouping associated with a fillable region.

* * * * *